United States Patent
Franklin

(10) Patent No.: US 9,086,013 B2
(45) Date of Patent: Jul. 21, 2015

(54) GEROTOR ROTARY STIRLING CYCLE ENGINE

(71) Applicant: Ethan W Franklin, Goleta, CA (US)

(72) Inventor: Ethan W Franklin, Goleta, CA (US)

( * ) Notice: Subject to any disclaimer, the term of this patent is extended or adjusted under 35 U.S.C. 154(b) by 210 days.

(21) Appl. No.: 13/795,632

(22) Filed: Mar. 12, 2013

(65) Prior Publication Data

US 2014/0271308 A1 Sep. 18, 2014

(51) Int. Cl.
| | | |
|---|---|---|
| *F01B 29/10* | (2006.01) | |
| *F01C 1/02* | (2006.01) | |
| *F02B 53/00* | (2006.01) | |
| *F02G 1/043* | (2006.01) | |
| *F02G 1/053* | (2006.01) | |
| *F02G 5/00* | (2006.01) | |
| *B60K 8/00* | (2006.01) | |
| *F01C 1/10* | (2006.01) | |

(52) U.S. Cl.
CPC . *F02B 53/00* (2013.01); *B60K 8/00* (2013.01); *F01C 1/103* (2013.01); *F02G 1/043* (2013.01); *F02G 1/053* (2013.01); *F02G 5/00* (2013.01); *F02G 2243/30* (2013.01); *F02G 2270/10* (2013.01); *Y02T 10/17* (2013.01)

(58) Field of Classification Search
CPC .......... F02B 53/00; F01C 1/103; B60K 8/00; F02G 5/00; F02G 1/043; F02G 1/053; F02G 2270/10; F02G 2243/30; Y02T 10/17
USPC .................................. 60/517–526; 418/61.3
See application file for complete search history.

(56) References Cited

U.S. PATENT DOCUMENTS

| | | | | |
|---|---|---|---|---|
| 3,426,525 A | | 2/1969 | Rubin | |
| 3,487,424 A | * | 12/1969 | Leger | .................................. 62/6 |
| 3,509,718 A | | 5/1970 | Fezer | |
| 3,744,245 A | * | 7/1973 | Kelly | .............................. 60/519 |
| 3,800,526 A | | 4/1974 | Wahnschaffe | |
| 3,986,354 A | | 10/1976 | Erb | |
| 4,009,573 A | | 3/1977 | Satz | |
| 4,103,491 A | * | 8/1978 | Ishizaki | .......................... 60/519 |
| 4,206,604 A | | 6/1980 | Reich | |
| 4,235,075 A | | 11/1980 | Erb | |
| 4,392,351 A | * | 7/1983 | Doundoulakis | ................. 60/526 |
| 5,335,497 A | | 8/1994 | Macomber | |
| 5,611,201 A | | 3/1997 | Houtman | |
| 5,706,659 A | | 1/1998 | Houtman | |
| 5,722,239 A | | 3/1998 | Houtman | |
| 5,771,694 A | | 6/1998 | Houtman | |
| 5,813,229 A | | 9/1998 | Gaiser | |
| 5,836,846 A | | 11/1998 | Hewko | |
| 5,865,091 A | | 2/1999 | Domanski | |

(Continued)

*Primary Examiner* — Hoang Nguyen

(74) *Attorney, Agent, or Firm* — Guy Cumberbatch

(57) ABSTRACT

Stirling cycle engines with hot and cold gerotor sets separated by an insulation barrier. The barrier has regenerative gas passages to allow gasses to flow therethrough thus connecting displacing chambers of the hot and cold gerotor sets. Each gerotor set has a rotor within a stator and displacing chambers created in an offset space therebetween. The stators may rotate about the rotors, or vice-versa. Either the rotor of the cold gerotor set has an axis of rotation offset with respect to the rotor of the hot gerotor set or the stator of the cold gerotor set has an axis of rotation offset with respect to the stator of the hot gerotor set, and the non-offset rotors or stators rotate about a common axis and are rotationally connected and create an angular phase offset between connected hot and cold chambers. The gerotor apparatuses may be utilized for a Stirling cycle engine for generating electricity, for example.

20 Claims, 22 Drawing Sheets

(56) References Cited

U.S. PATENT DOCUMENTS

| | | |
|---|---|---|
| 6,336,317 B1 * | 1/2002 | Holtzapple et al. .......... 60/39.63 |
| 6,536,207 B1 * | 3/2003 | Kamen et al. ................. 60/39.6 |
| 7,062,913 B2 | 6/2006 | Christensen |
| D537,480 S | 2/2007 | Sullivan |
| 7,730,723 B2 * | 6/2010 | Yaguchi et al. ................ 60/597 |
| 2007/0237665 A1 | 10/2007 | Holtzapple |
| 2008/0031760 A1 | 2/2008 | Phillips |
| 2009/0087333 A1 | 4/2009 | McCrindle |

* cited by examiner

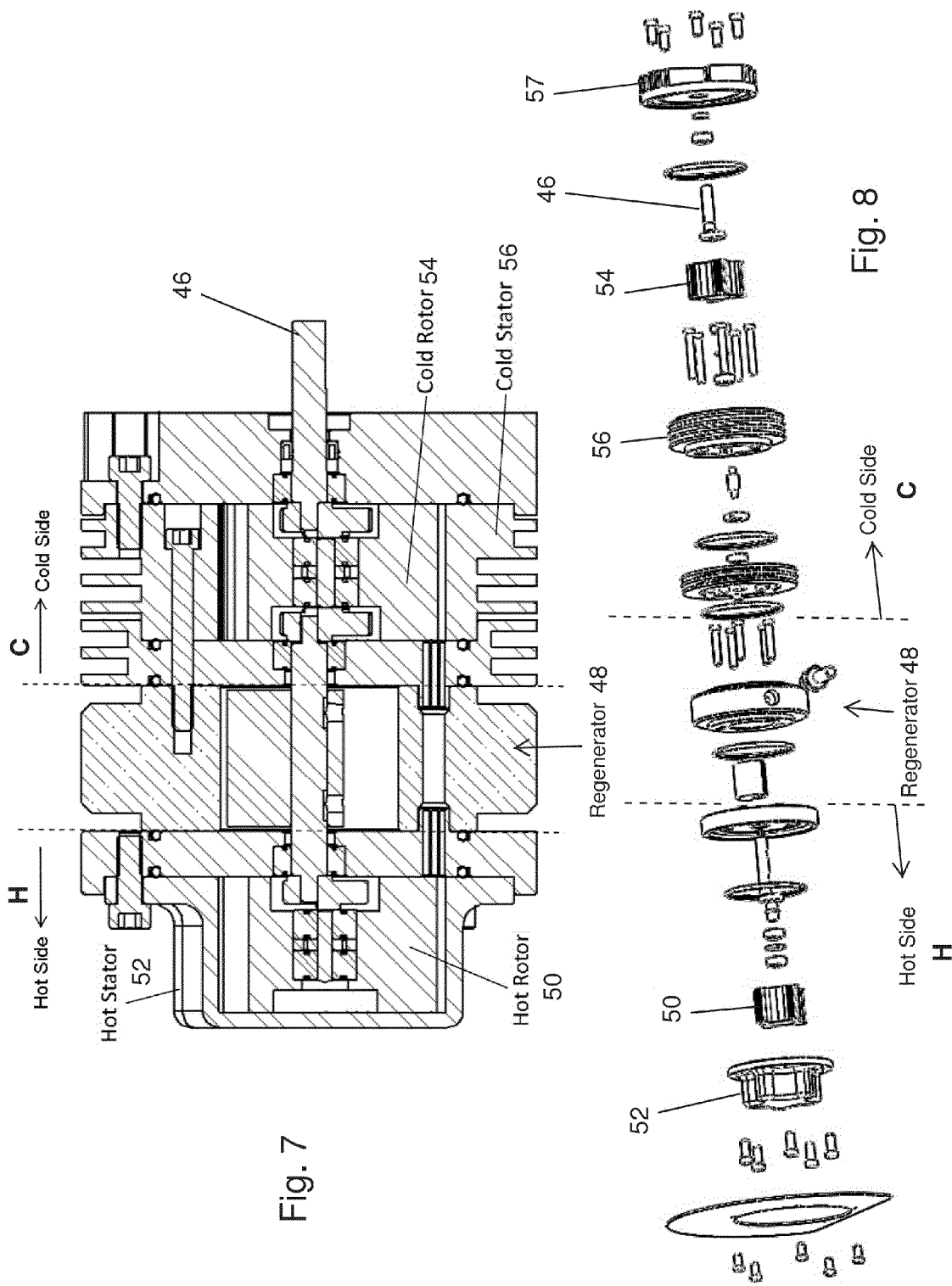

Hot Side H

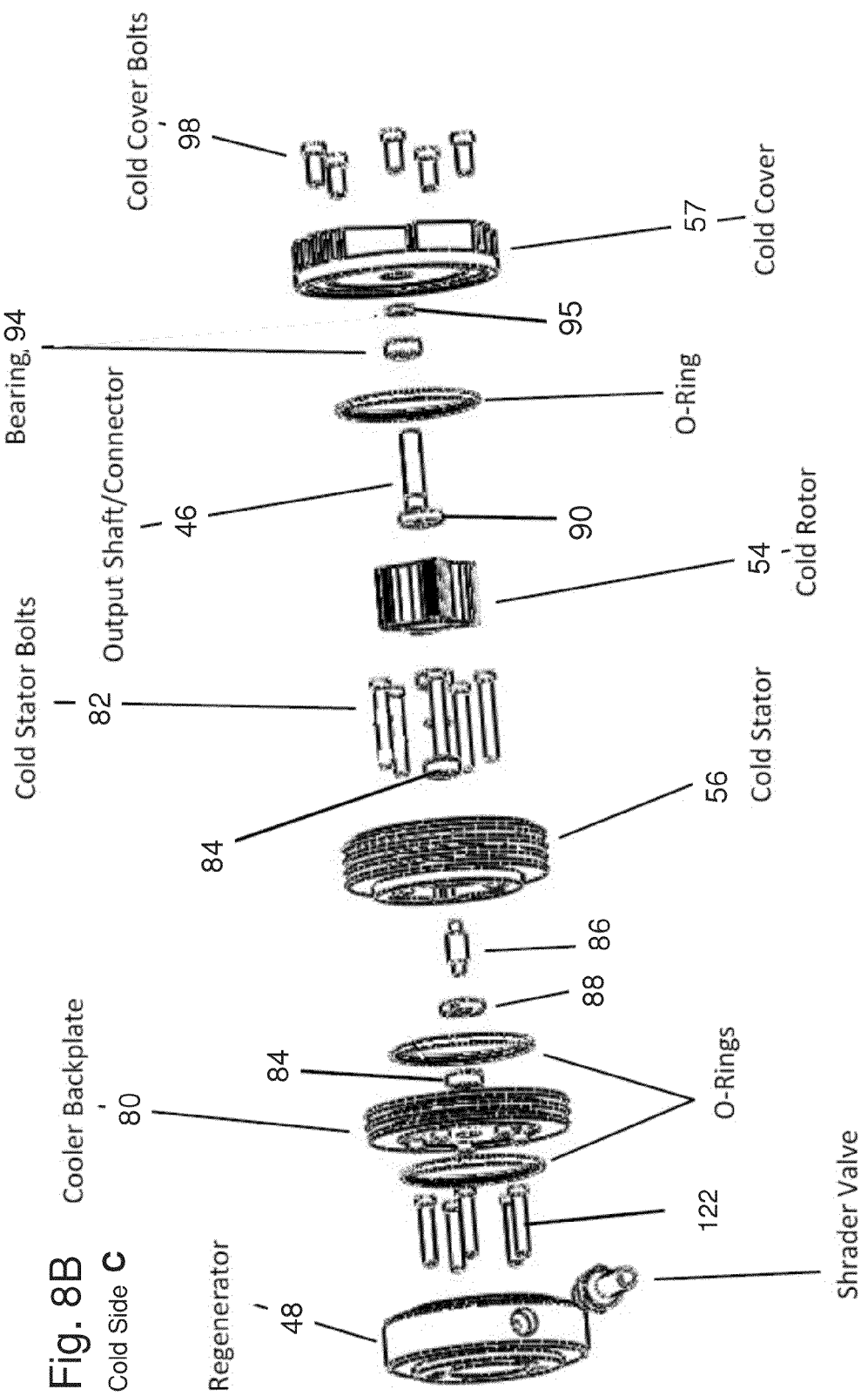
Fig. 8B Cold Side C

ASSEMBLY ISO VIEWS

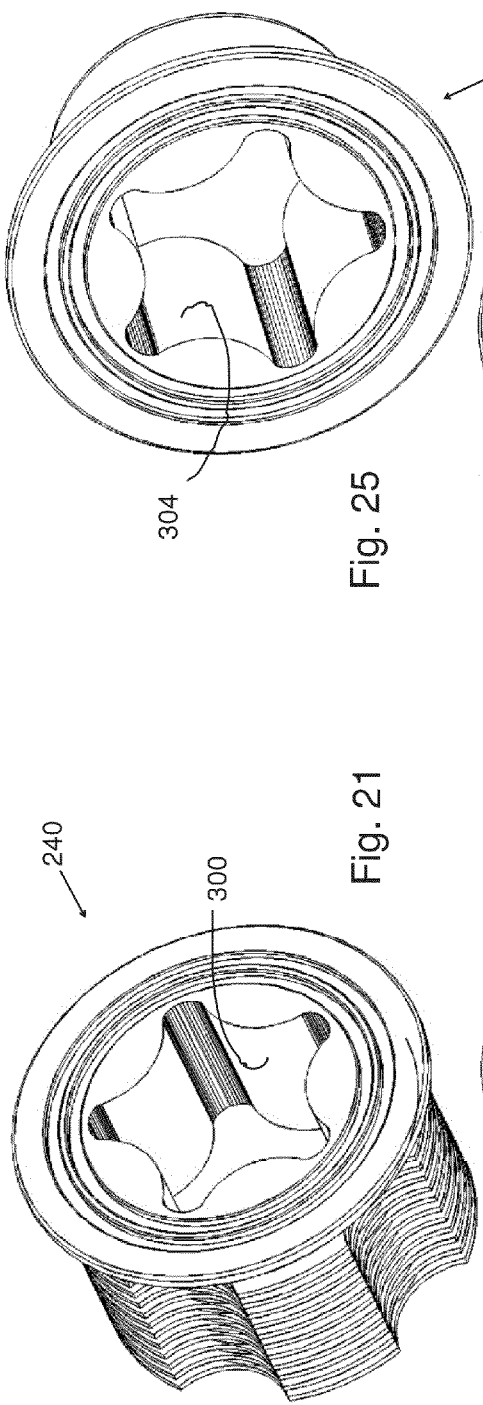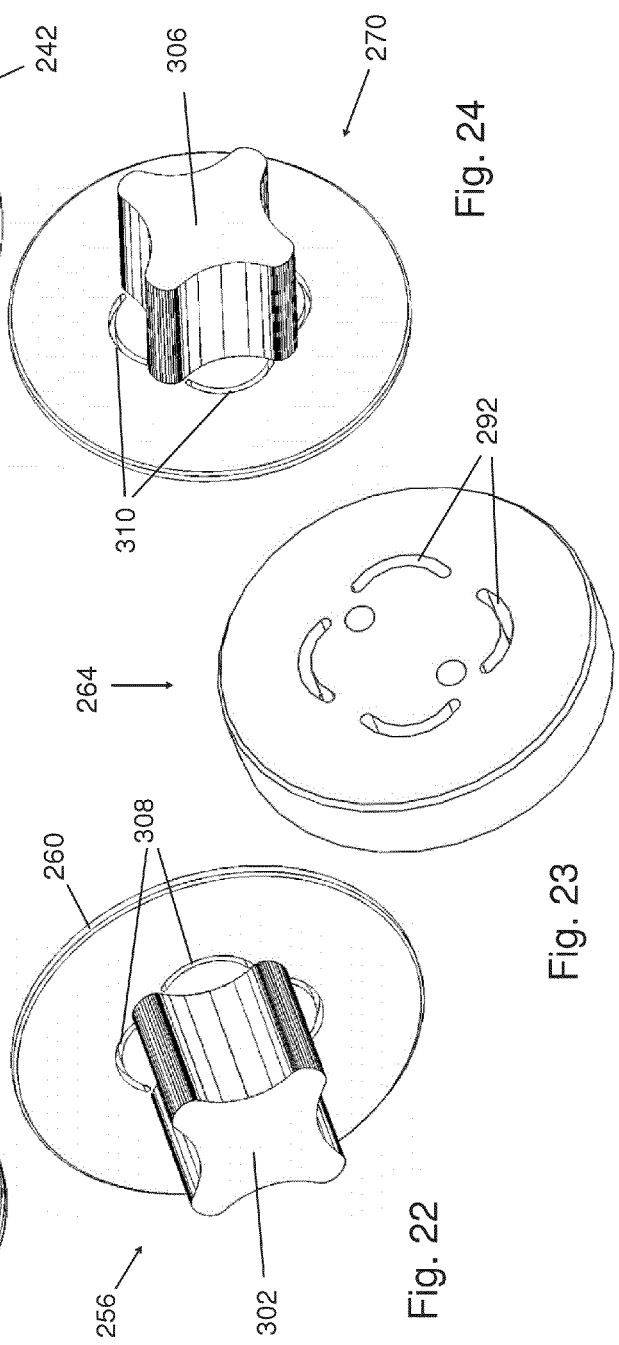

GEROTOR ROTARY STIRLING CYCLE ENGINE

FIELD OF THE INVENTION

This invention relates generally to efficient power generation and other useful energy production such as heat engines and, more particularly, to a highly efficient gerotor-type rotary Stirling cycle engine and methods of operation.

BACKGROUND OF THE INVENTION

In a world of vanishing resources such as coal, oil, and natural gas, it is not only important to be more efficient in our use of energy, but also to improve on our abilities to efficiently extract energy from renewable resources such as hydroelectric, wind, geothermal and solar. To eventually replace fossil fuels with renewable sources of energy it must be feasible to do so. Currently renewable power conversion systems must operate at higher efficiencies if they are to provide the huge amounts of energy consumed by humans on the planet.

There are currently several types of heat engines, each with its own characteristics and cycles. These heat engines include the Otto cycle engine, the Diesel cycle engine, the Brayton cycle engine, the Rankine cycle engine, the Stirling cycle engine, the Erickson cycle engine, and the Carnot cycle engine. A brief description of each engine is provided below.

The Otto cycle engine is an inexpensive, internal combustion, low-compression engine with a fairly low efficiency. This engine is widely used to power automobiles.

The Diesel cycle engine is a moderately expensive, internal combustion, high-compression engine with a high efficiency that is widely used to power trucks and trains.

The Brayton cycle engine is an internal combustion engine that is generally implemented with turbines and is generally used to power aircraft and some electric power plants. The Brayton cycle features very high power density, normally does not use a heat exchanger, and has a lower efficiency than the other cycles.

The Rankine cycle engine is an external combustion engine that is generally used in electric power plants. Water is the most common working fluid.

The Erickson cycle engine uses isothermal compression and expansion with constant-pressure heat transfer. It may be implemented as either an external or internal combustion cycle. In practice, a perfect Erickson cycle is difficult to achieve because isothermal expansion and compression are not readily attained in large industrial equipment.

The Carnot cycle engine uses isothermal compression and expansion and adiabatic compression and expansion. The Carnot cycle may be implemented as either an external or internal combustion cycle. It features low power density, mechanical complexity, and difficult-to-achieve constant-temperature compressor and expander.

The Stirling cycle engine uses isothermal compression and expansion with constant-volume heat transfer. It is almost always implemented as an external combustion cycle. It has a higher power density than the Carnot cycle, but it is difficult to perform the heat exchange, and it is difficult to achieve constant-temperature compression and expansion. A Stirling engine is a commonly used piece of equipment for power conversion and processing and has plenty of room for improvement. Currently one of the most promising configurations of a solar power conversion system is that of a Stirling engine attached to the focal point of a mirrored parabolic dish pointed at the sun. The mirrors focus the sun's radiation on the hot side of the Stirling engine to produce mechanical power which is fed to an alternator to create electricity at high efficiencies. Even so, the Stirling engines used are not necessarily operating at their full efficiency potential.

The Otto cycle, the Diesel cycle, the Brayton cycle, and the Rankine cycle all have efficiencies less than the maximum because they do not use isothermal compression and expansion steps. Further, the Otto and Diesel cycle engines lose efficiency because they do not completely expand high-pressure gases, and simply throttle the waste gases to the atmosphere.

The Stirling, Erickson, and Carnot cycles are as efficient as nature allows because heat is delivered at a uniformly high temperature, $T_{hot}$, during the isothermal expansion, and rejected at a uniformly low temperature, $T_{cold}$, during the isothermal compression. The maximum efficiency, $\eta_{max}$, of these three cycles is: $\eta_{max}=1-(T_{cold}/T_{hot})$. This efficiency is attainable only if the engine is "reversible," meaning that the engine is frictionless, and that there are no temperature or pressure gradients. In practice, real engines have "irreversibilities," or losses, associated with friction and temperature/pressure gradients.

Reducing the size and complexity of any of these engines, while increasing efficiency, is important for a number of reasons. In most of the developing third world, adequate supplies of drinking water and water for irrigation are a scarce commodity. In many places in Africa, India and Central and South America, adequate supplies of water are found only at considerable depth below the surface. These locations generally do not have the infrastructure to provide an electrical grid to pump the water with electricity, nor do they have the infrastructure to provide roads to bring in electrical generators or even the fuel for those generators. Without an electrical grid, or without generators to generate electricity, maintaining a supply of potable water in isolated areas is a challenge, and refrigeration to keep medicine or foodstuffs from spoiling is unavailable. Even in the United States, there are communities such as the Amish communities where electricity is banned. Here the lack of cooling capabilities severely limits the production of various products. Because of the lack of cooling, milk production is limited to Grade B.

Consequently, there is a need for more efficient heat engine for converting the heat from the sun into mechanical energy, and ultimately for power generation, and a need for more portable systems.

SUMMARY OF THE INVENTION

The present application describes power systems including Stirling cycle engines with hot and cold gerotor sets separated by an insulation barrier. The barrier has regenerative gas passages to allow gasses to flow therethrough thus connecting displacing chambers of the hot and cold gerotor sets. Each gerotor set has a rotor within a stator and displacing chambers created in an offset space therebetween. The stators may rotate about the rotors, or vice-versa. Either the rotor of the cold gerotor set has an axis of rotation offset with respect to the rotor of the hot gerotor set or the stator of the cold gerotor set has an axis of rotation offset with respect to the stator of the hot gerotor set, and the non-offset rotors or stators rotate about a common axis and are rotationally connected and create an angular phase offset between connected hot and cold chambers. The gerotor apparatuses may be utilized for a Stirling cycle engine for generating electricity, for example.

An exemplary power system comprises a housing having an output drive shaft defining a central axis. A hot side includes a hot rotor and a hot stator and displacing chambers created in an offset space therebetween, the hot stator being fixed with respect to the housing and centered along the axis, while the hot rotor rotates within the hot stator about an axis offset with respect to the central axis and is connected to rotate the drive shaft. A cold side includes a cold rotor and a cold stator and displacing chambers created in an offset space therebetween, the cold stator being fixed with respect to the housing and centered along the axis, while the cold rotor rotates within the cold stator about an axis offset with respect to the central axis and is connected to rotate the drive shaft. The rotational angle of the cold rotor is out of phase with the rotational angle of the hot rotor. A barrier member of thermally insulating material between the hot and cold rotors has regenerative gas passages to allow gasses to flow therethrough, thus connecting the displacing chambers of the hot and cold sides.

An exemplary power system includes a Stirling cycle engine with a hot gerotor set having a rotor rotating within a stator and displacing chambers created in an offset space therebetween. A cold gerotor set has a rotor rotating within a stator and displacing chambers created in an offset space therebetween. Either the rotor of the cold gerotor set has an axis of rotation offset with respect to the rotor of the hot gerotor set, or the stator of the cold gerotor set has an axis of rotation offset with respect to the stator of the hot gerotor set. The non-offset rotors or stators rotate about a common axis, are rotationally connected, and create an angular phase offset between connected hot and cold chambers. Finally, a barrier member of thermally insulating material between the hot and cold gerotor sets has regenerative gas passages to allow gasses to flow therethrough, thus connecting the displacing chambers of the hot and cold gerotor sets.

In another embodiment, a Stirling cycle engine comprises a hot gerotor set having inner and outer elements and displacing chambers in series with a cold gerotor set having rotor and outer elements and displacing chambers. The outer element of one set rotates about an axis offset with respect to the outer element of the other set, and the rotor elements are axially aligned and rotationally connected. A low thermal conductivity barrier between the hot and cold gerotor elements have regenerative gas passages to allow gasses to flow therethrough, wherein the displacing chambers of the hot and cold gerotor sets are connected via the regenerative gas passages.

A power system disclosed herein includes, a battery, an electric generator having the drive shaft as an input and coupled to recharge the battery, and any of the Stirling cycle engines disclosed herein is connected to drive the electric generator. The power system may further include a drive transmission, an internal combustion engine coupled to the drive transmission, and an electric drive system coupled to the drive transmission and powered by the battery.

BRIEF DESCRIPTION OF THE DRAWINGS

Features and advantages of the present invention will become appreciated as the same become better understood with reference to the specification, claims, and appended drawings wherein:

FIG. 7 is a vertical sectional view along a center line of the gerotor Stirling cycle engine taken along line 7-7 of FIG. 6B;

FIG. 8 is an exploded perspective view of the gerotor Stirling cycle engine of the present application;

FIGS. 8A and 8B are exploded perspective views of the gerotor Stirling cycle engine shown enlarged in two parts from FIG. 8;

FIGS. 21-25 are perspective views of hot and cold stator and rotor elements and a central insulator from the gerotor Stirling cycle engine of the present application.

DETAILED DESCRIPTION OF THE PREFERRED EMBODIMENTS

The present application illustrates an exemplary embodiment of a gerotor apparatus useful in a number of applications, in particular for power generation. Generally, the following detailed description describes gerotor apparatuses as being used in the context of a gerotor compressor; however, the following gerotor apparatuses may function equally as well as gerotor expanders or other suitable gerotor apparatuses. In addition, the present invention contemplates that the gerotor apparatuses described below may be utilized in any suitable application; however, the gerotor apparatuses described below are particularly suitable for a Stirling cycle engine.

With this device, any heat source, temperature differential, or cold source can be used to generate mechanical power on site or electricity with the help of an alternator. One clean and plentiful source for which this particular engine is designed is concentrated solar radiation producing goal temperatures of around 1000° F. The solar rays are desirably concentrated by a reflective parabolic dish or a lens of proper size, focusing the radiation energy onto a smaller point on the hot side of the engine. Of course, many other heat sources can be used to power this device, such as geothermal, nuclear burning, combustion (chemical burning), exhaust systems in gasoline engines and other power plants or water cooling systems for industrial processes where heat is rejected at temperatures above ambient. The higher the temperature differential, the more efficiently the device can operate. Large temperature differentials existing in very cold ambient environments are ideal.

In addition to being able to convert heat flow to mechanical energy, if these devices are driven mechanically, they produce heat flow or act as a heat pump. One side of the device will get cold and the other side will get hot. This can be used for most refrigeration or heating applications where mechanical power is available.

A gerotor is a widely used pumping mechanism that utilizes a pair of meshed gears in a chamber to create a pumping action to pump various liquids (e.g., oil). One of the gears is an inner gear with outer gear teeth, and the other gear is an outer gear with inner gear teeth. The inner gear has one less gear tooth than the outer gear. The two gears rotate about different axes and the offset created by the feature(s) of the inner gear in relation to the outer gear establishes a series of changing cavity between the gears.

Figure 1:
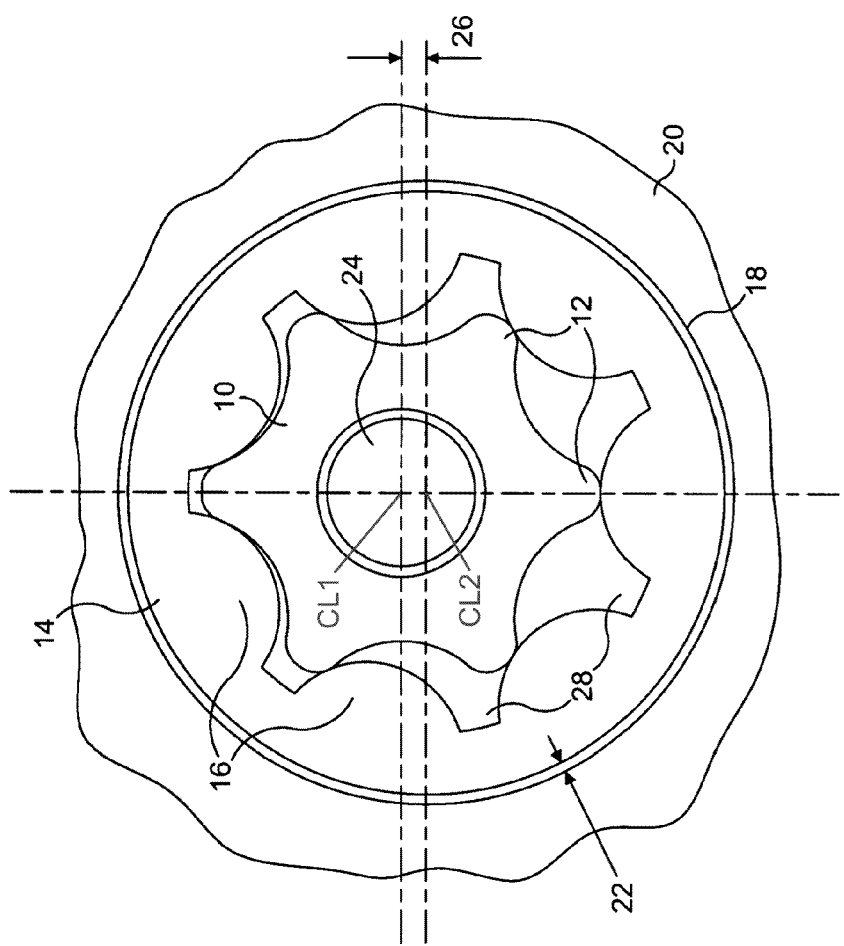
FIG. 1 is a schematic representation of a prior art gerotor pump illustrating aspects of the pump geometry.

FIG. 1 is a schematic representation of a known gerotor pump configuration illustrating the pump geometry. The gerotor pump comprises an internal spur gear type arrangement with an inner gear rotor 10 having n protruding teeth 12 and an outer gear rotor 14 having n+1 protruding teeth 16. In the illustrated example, the inner gear rotor 10 has six teeth 12 (n=6) and the outer gear rotor 14 has seven teeth 16 (n+1=7). The outer gear rotor 14 rotates within a circular section rotor chamber defined by a bore 18 in a housing part 20.

Desirably, there is a constant radial clearance 22 between the circular outer periphery of the outer gear rotor 14 and the cylindrical wall defining the bore 18.

A drive shaft 24 secured to the inner gear rotor 10 is supported for rotation by the housing 20 such that the drive shaft 24 can rotate the inner gear rotor 10 and, by engagement of the teeth 12, 16, the outer gear rotor 14 so that both the rotors are rotated in the bore 18 by the drive shaft. The axis of rotation CL1 of the inner gear rotor 10 is offset in the vertical direction with respect to the axis of rotation CL2 of the outer gear rotor 14—CL2; that latter which coincides with the axis of the bore 18. The offset is indicated by dimension 26.

In use, as the drive shaft 24 rotates the rotors 10, 14 relative to one another, the respective sets of teeth 12, 16 form a series of pumping chambers 28 therebetween. The relative rotation of the inner and outer gear rotors 10, 14 causes the pumping chambers 28 to cyclically increase and then decrease in size. An inlet port (not shown) is provided in the housing 20 in the region of a rotational position of the rotors 10, 14 at which the pumping chambers 28 are relatively large and an outlet port (not shown) is provided in the housing 20 in the region of a rotational position at which the pumping chambers are relatively small. Typically, the ports are located approximately 180° apart and are kidney shaped.

As the size of a pumping chamber 28 increases, a vacuum is created so that as the pumping chamber sweeps past the inlet port, the fluid to be pumped is sucked into the pumping chamber. As the size of the pumping chamber decreases, the fluid is pumped (compressed if the fluid is a gas) and then swept out of the pumping chamber as the pumping chamber passes over the outlet port. The arrangement of the rotors 10, 14 and the inlet and outlet ports is such that a gerotor pump can provide a relatively pulseless output. It should be noted that significant friction can be removed from the system by avoiding the need to rotate the outer and inner gerotor elements within a fixed housing as in a typical pumping application. Wobbling the inner gerotor with an offset shaft within a fixed outer element (unbalanced) or if the outer element is to be rotated, it shall be the housing (Shaft is Fixed; Balanced). This results in no moving seals or bearings for the larger diameter element. This means only the surface seals of the inner rotor slide which drastically reduces friction.

An example of an application in which the gerotor apparatuses described herein may be utilized is within a Stirling engine. Stirling engines have a reversible thermodynamic cycle and therefore can be used as a means of delivering mechanical output energy from a source of heat, or acting as a heat pump through the application of mechanical input energy. Using various heat sources such as combusted fossil fuels or concentrated solar energy, mechanical energy can be delivered by the engine. This energy can be used to generate electricity or be directly mechanically coupled to a load. In the case of a motor vehicle application, a Stirling engine could be used to directly drive traction wheels of the vehicle through a mechanical transmission. Another application in the automotive environment is for use with a so-called "hybrid" vehicle in which the engine drives an alternator for generating electricity which charges storage batteries. The batteries drive the vehicle through electric motors coupled to the traction wheels. Still other technologies for energy storage could be coupled to a Stirling engine in a hybrid vehicle such as flywheel or thermal storage systems, etc.

Figure 2:
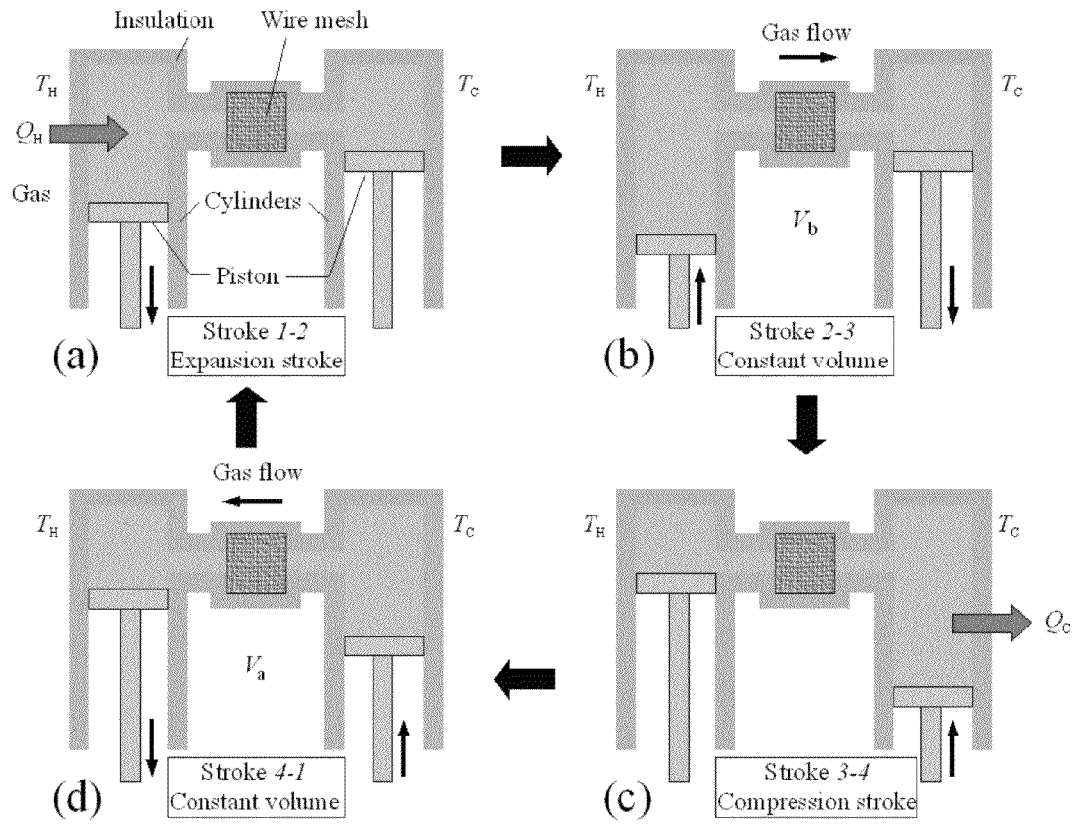
FIG. 2 is a schematic block diagram of a Stirling cycle engine known in the art, illustrating four discrete stages (a)-(d)
Figure 3:
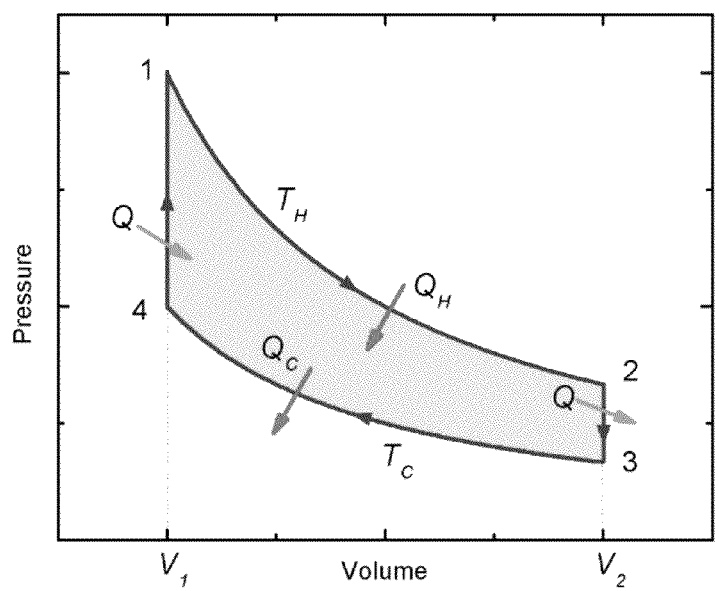
FIG. 3 is a graph mapping pressure-volume curves from the four discrete stages of the Stirling cycle shown in FIG. 2.

FIG. 2 is a schematic diagram of a Stirling cycle engine. The Stirling engine operates by repeatedly completing a sequence of four steps. Each step in the sequence is reversible and together they form the Stirling cycle. To help understand each of the four steps in the Stirling cycle consider two piston-cylinder systems whose chambers have been filled with a gas and are connected by a narrow tube. The left piston is at temperature $T_H$ and the right piston is at temperature $T_C < T_H$. In the center of the tube that connects the two chambers is a wire mesh that will be used to temporarily store heat as described below. For each step in the Stirling cycle, the schematic stages of FIG. 2 will be mapped to curves on a pressure-volume plot of the Stirling cycle shown in FIG. 3. The four steps of the idealized Stirling cycle are:

FIG. 2a—Stroke 1→2: The gas in the engine expands at the constant temperature $T_H$. The left piston is free to move down and the right piston is fixed. In order to maintain a constant temperature, the gas must absorb heat $Q_H$ from the reservoir (Isothermal expansion, path 1→2 in FIG. 3).

FIG. 2b—Stroke 2→3: At constant volume $V_2$, the temperature of the gas is reduced from $T_H$ to $T_C$. The gas in the left cylinder compresses by upward movement of its piston, and the gas in the right piston expands by retraction of its piston so that the total volume remains fixed. The hot gas is forced from the left chamber to the right chamber. As the gas passes through the narrow tube it delivers heat Q to the wire mesh. (Constant volume heat removal, path 2→3 in FIG. 3)

FIG. 2c—Stroke 3→4: The gas compresses at constant temperature $T_C$. The right piston moves up to compress the gas and the left piston is fixed. To maintain a constant temperature the gas releases heat $Q_C$ to the thermal reservoir at $T_C$. (Isothermal compression, path 3→4 in FIG. 3).

FIG. 2d—Stroke 4→1: At constant volume $V_1$, the temperature of the gas is increased from $T_C$ to $T_H$. The gas in the left piston expands by retraction of the left piston, and the gas in the right piston compresses by advancement of the right piston so that the total volume remains fixed. The cold gas is forced from the right chamber to the left chamber. As the gas passes through the narrow tube it recovers the heat Q stored in the hot wire mesh. (Constant volume heating, path 4→1 in FIG. 3).

Figure 4A:
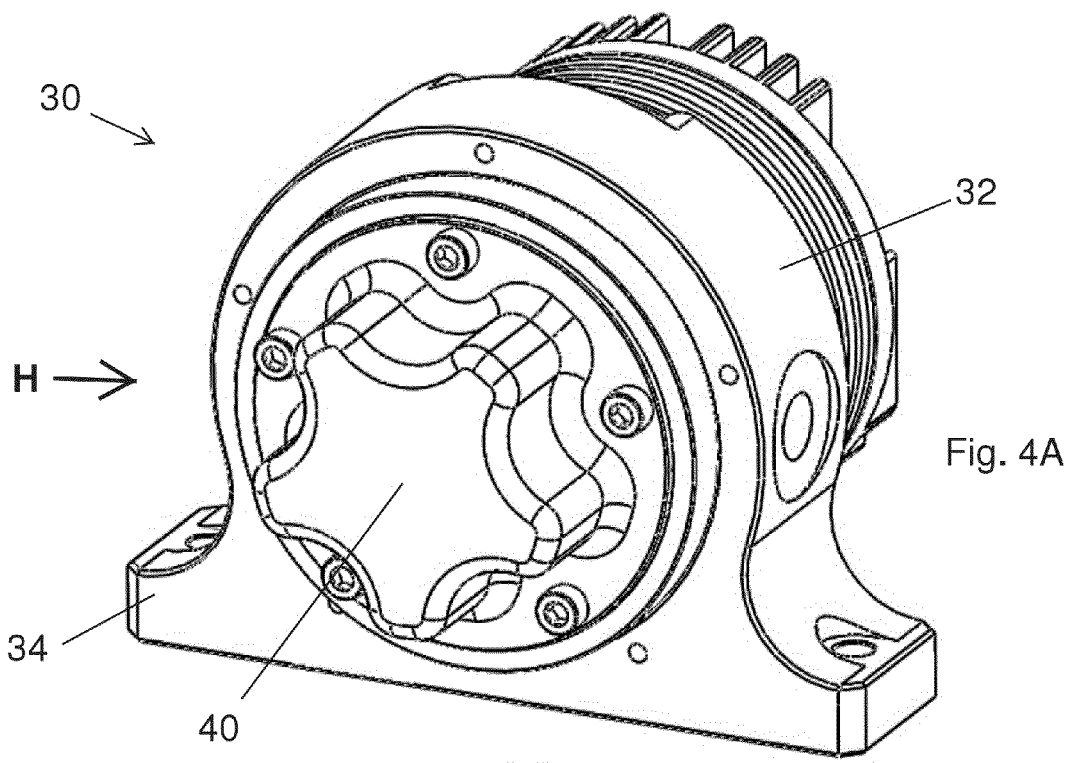
FIGS. 4A and 4B are perspective views of an exemplary gerotor Stirling cycle engine with a mounting frame from, respectively, a hot side and a cold side.
Figure 4B:
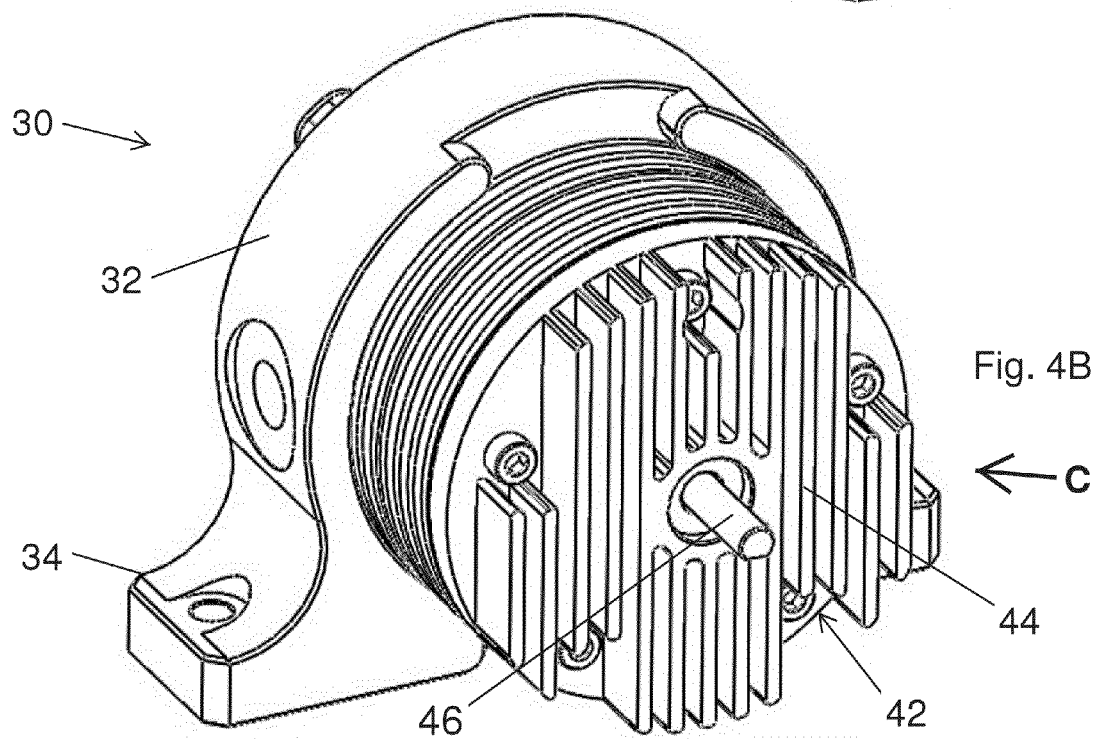
Figure 5A:
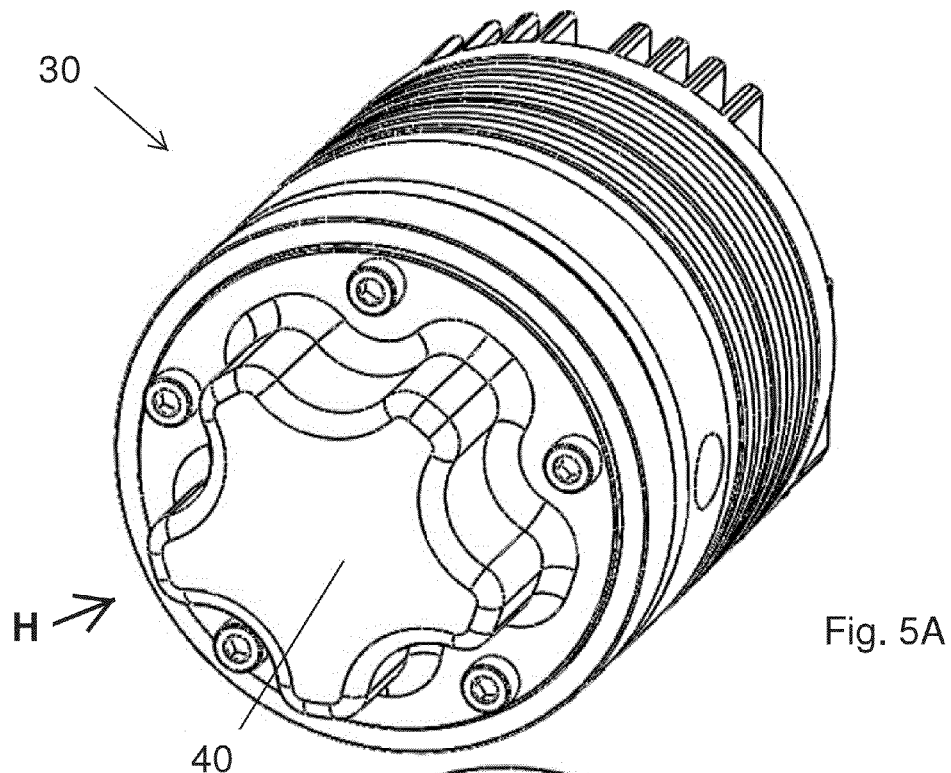
FIGS. 5A and 5B are perspective views of an exemplary gerotor Stirling cycle engine without the mounting frame from, respectively, a hot side and a cold side.
Figure 5B:
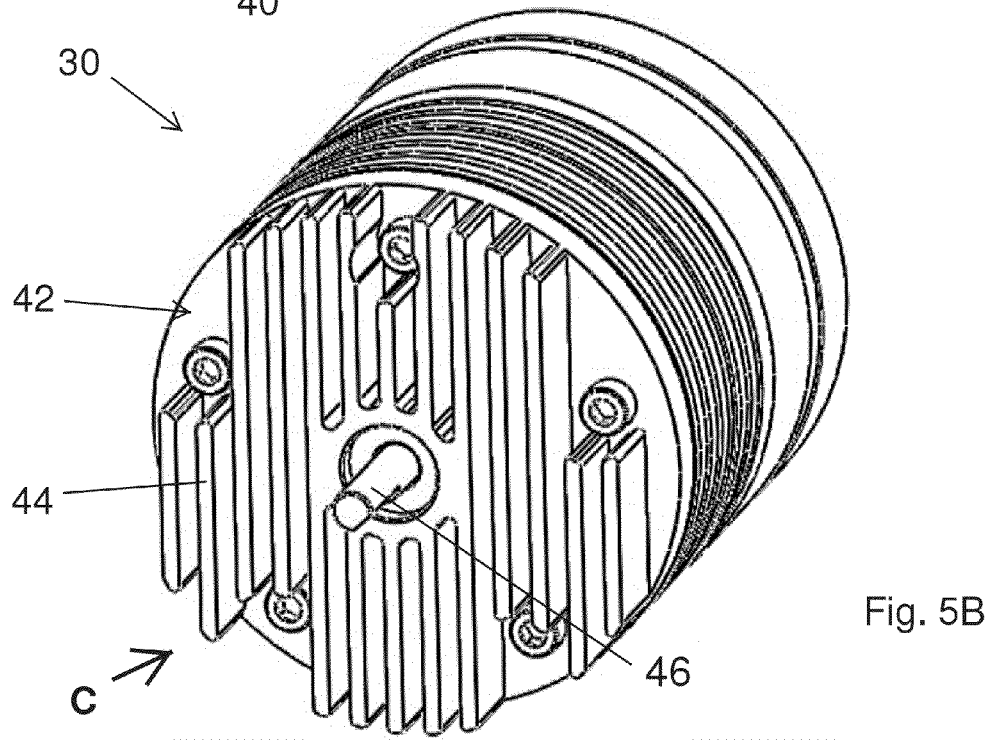
Figure 6A:
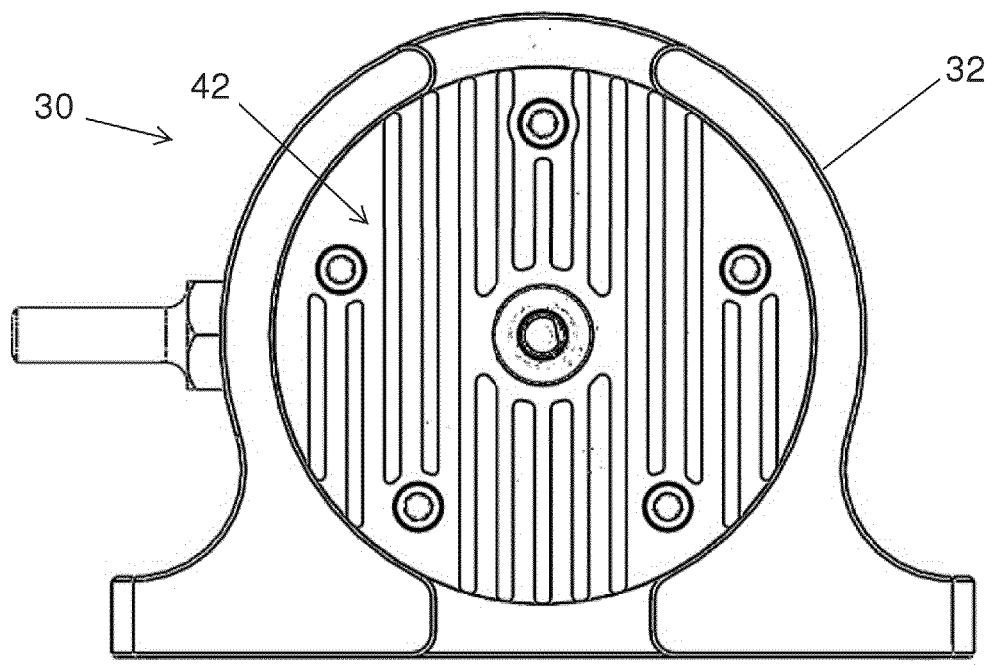
FIG. 6A is an elevational view of the cold side of the gerotor Stirling cycle engine with the mounting frame.
Figure 6B:
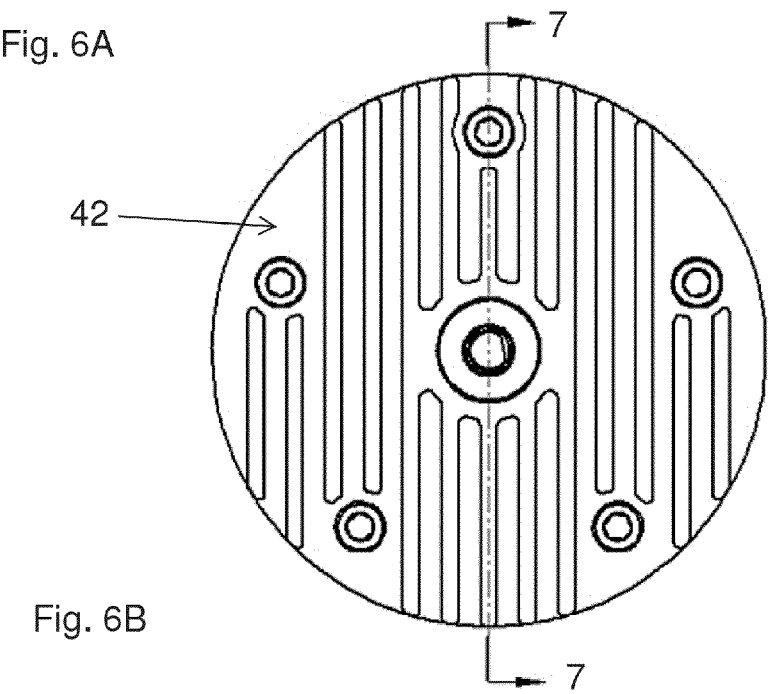
FIG. 6B shows the same view without the mounting frame.

FIGS. 4A and 4B are perspective views of an exemplary gerotor Stirling cycle engine 30 of the present application from, respectively, a "hot" side H and a "cold" side C, while FIGS. 5A and 5B are the same views without a mounting frame 32. The illustrated engine 30 comprises the outer mounting frame 32 generally shaped as a cylinder oriented with a horizontal axis and having a pair of outward flanges 34 on its lower end for mounting to a support structure or foundation (not shown). As seen in FIGS. 4A/4B, the outer housing 32 defines a cylindrical through space from which a smooth hot side stator 40 projects on the hot side H, while a finned cold side stator 42 projects on the cold side C. The terms "hot" and "cold" sides refer to the relative temperature of the gases within the engine 30, and do not necessarily reflect absolute temperatures. FIG. 6A is an elevational view of the cold side of the gerotor Stirling cycle engine 30 with the mounting frame 32, and FIG. 6B shows the same view without the mounting frame.

When operational, the hot side H seen in FIGS. 4A and 5A is exposed to an elevated temperature (heat source), such as by directing solar rays to the hot side stator 40 or exposing the hot side H to exhaust gases from an internal combustion engine. By virtue of the components within the engine 30, as will be explained, differential temperatures cause airflow which, in turn, rotates a gerotor assembly which motion can be directed to a pump, generator or other secondary device to do useful work. The cold side stator 42 features a plurality of arrayed fins 44 for heat dissipation.

The engine 30 can run in two ways. The first way holds the outer elements/housing fixed. In this way, the cold and hot side rotor rotate or wobble in their respective outer elements connected via a common output shaft 46 with offset segments. Power is delivered via this shaft 46 where it exits the engine. This is the most common operating mode and will be the basis for discussion herein. In another mode of operation, the shaft can be held fixed and both the hot side stator 40 and the cold side stator 42 rotate together, and the power is delivered via the outer elements/housing of the engine which can be coupled to the aforementioned secondary device. Other modes of operation are described below.

It should be understood that the particular configuration illustrated is exemplary only, and the overall configuration of the engine 30 can be modified to fit particular environments. Furthermore, the size of the engine 30 can theoretically be scaled upward or downward as needed, though if the moving components become too large overcoming inertia may be a concern, while if the moving components are too small friction may become a detrimental factor.

Figure 8A:
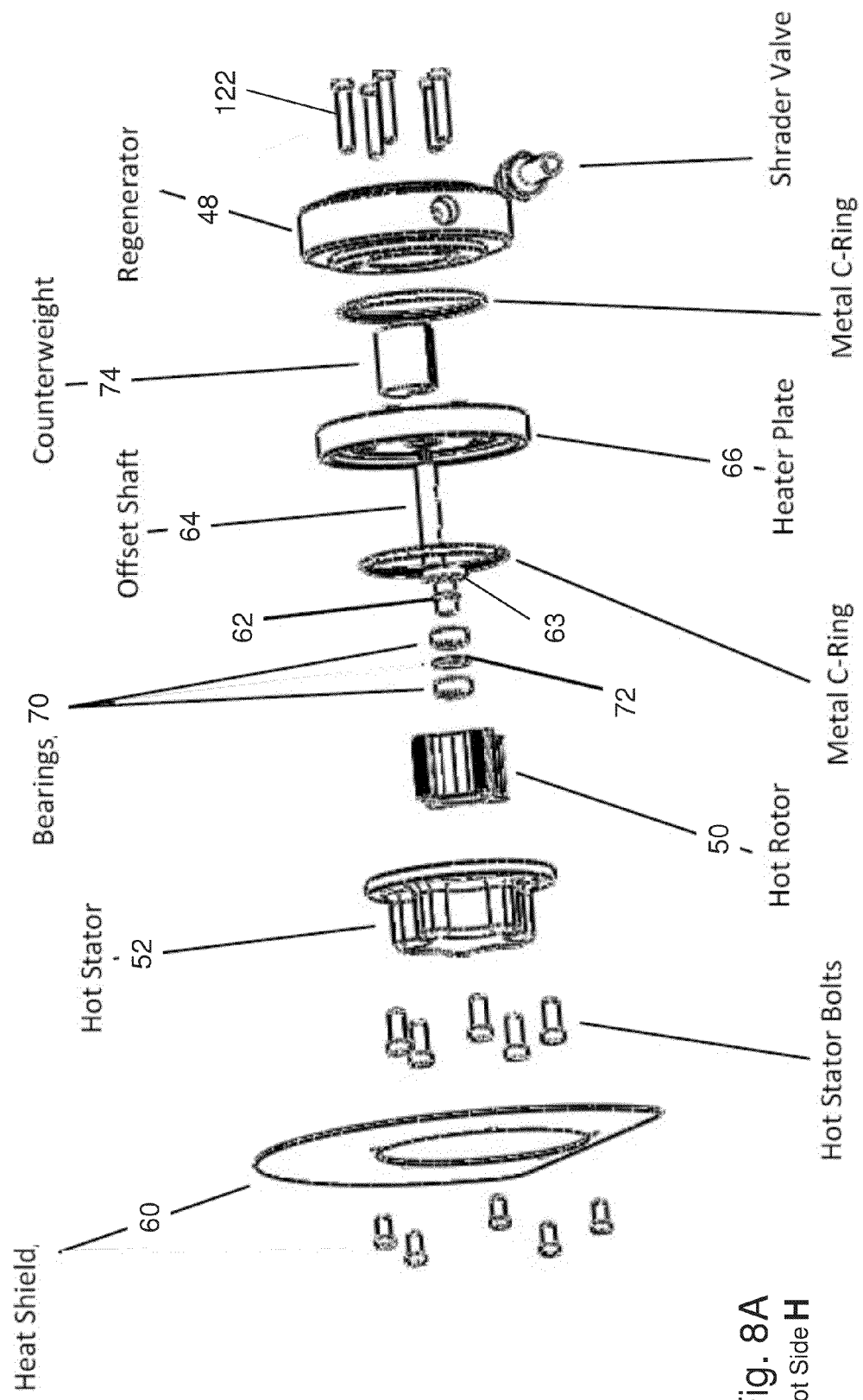

FIG. 7 is a vertical sectional view along a center line of the gerotor Stirling cycle engine 30 taken along line 7-7 of FIG. 6B, while FIG. 8 (and enlarged FIGS. 8A/8B) is an exploded perspective view of the gerotor Stirling cycle engine, wherein an exemplary series of internal components of the gerotor Stirling cycle engine 30 is shown. In general, the engine 30 is separated into a hot side H (on the left) and a cold side C (on the right) by a central regenerator 48. Once again, thermal energy input to the hot side H creates thermal gas flow through the engine 30 which ultimately results in rotation of the output shaft 46 on the cold side. FIG. 7 illustrates a hot rotor 50 within a hot stator 52, and a cold rotor 54 within a cold stator 56 having an outer cover 57. As with most such arrangements, the stators 52, 56 are stationary, while the rotors 50, 54 rotate there within.

Figure 9:
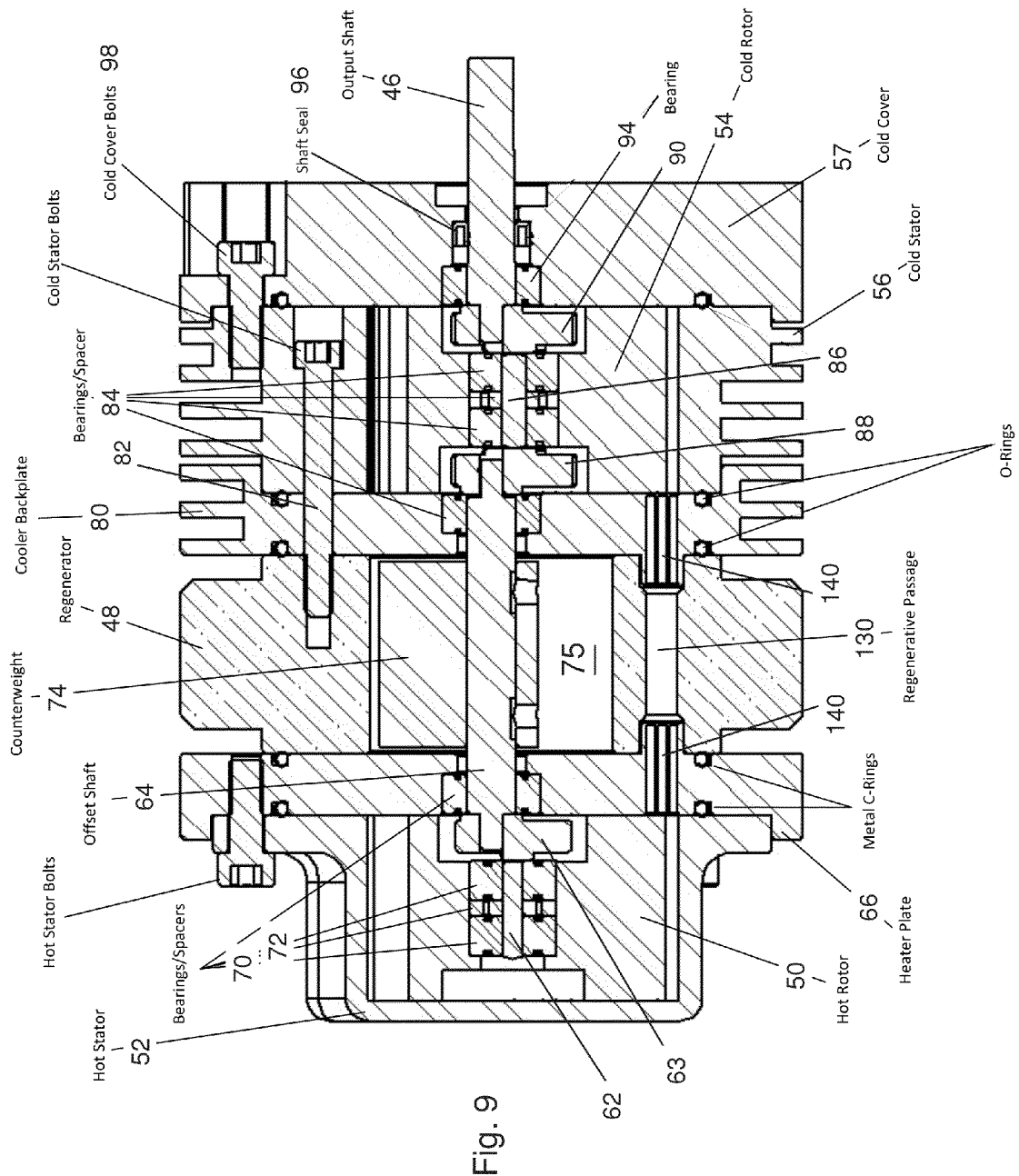
FIG. 9 is an enlarged vertical sectional view along a center line of the gerotor Stirling cycle engine taken along line 7-7 of FIG. 6B.
Figure 12:
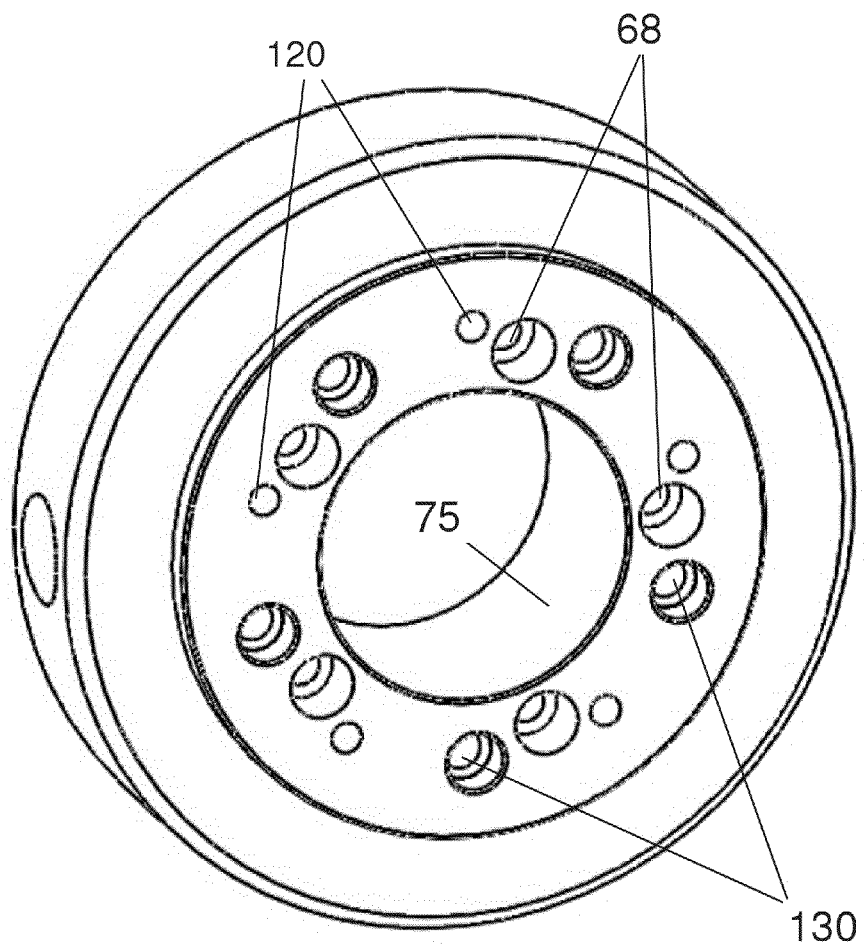
FIG. 12 is a perspective view of a central insulated regenerator element from the gerotor Stirling cycle engine of the present application.

Now with reference to FIGS. 8A and 8B and the sectional view of FIG. 9, and without going into great detail concerning the function thereof, a brief discussion of the engine elements as they are positioned axially in sequence from the hot side H to the cold side C will be provided. On the left side of FIG. 8A is shown a heat shield 60 which can be mounted with bolts on the hot side around the hot stator 52. The heat shield 60 is not shown in the other views, but may be included to help prevent heat directed at the hot stator 52 from radiating to the cold side of the engine 30. As mentioned, the hot rotor 50 fits into a space defined within the hot stator 52, and rotates on a hot rotor shaft 62 fixed via an offset connector 63 to rotate with a central shaft 64. The hot stator 52 mounts with bolts directly to the left side of an annular heater backplate 66, which in turn abuts on its right side against the central regenerator 48. FIG. 12 shows five (5) countersunk through holes 68 for mounting the heater backplate to the regenerator 48 with bolts 122. Bearings 70 and a spacer 72 permit the hot rotor 50 to rotate on the hot rotor shaft 62.

The central shaft 64 extends through the regenerator 48 and has a counterweight 74 attached thereto. The counterweight 74 rotates with the central shaft 64 in an enlarged space 75 formed within the regenerator 48, as seen in FIGS. 9 and 12.

Now with reference to FIG. 8B, the elements of the cold side of the engine 30 will be described. FIG. 8B again shows the regenerator 48 for congruity with FIG. 8A. A generally annular cooler backplate 80 is interposed between the regenerator 48 and the cold stator 56, and a series of bolts 82 hold these three elements together, as also seen in FIG. 9. The cold rotor 54 is journaled on bearings 84 that mount to a cold rotor shaft 86 fixedly attached to an offset connector 88. As seen in FIG. 9, the offset connector 88 fixes to the central shaft 64 within the cold rotor 54. On its other end, the cold rotor shaft 86 fixes to another offset connector 90 attached to the output shaft 46, again within the cold rotor 54. The output shaft 46 projects through the cold cover 57 and is journaled therein using bearings 94. A shaft seal 96 contains any lubrication used from leaking through the aperture in the cold cover 57. A series of bolts 98 connect to the cold cover 57 to the cold stator 56.

With reference to FIG. 9, the connection of the moving parts within the engine 30 will be described. Starting in the middle, the central shaft 64 is journaled about both ends within fixed bores in the heater backplate 66 and the cooler backplate 80, respectively, and thus spins about its own axes. The central shaft 64 is located at the axis of the regenerator 48. It is the hot rotor shaft 62 and the cold rotor shaft 86 that do not rotate about their own axes and are thus "offset." The hot rotor 50 on the left rotates with the hot rotor shaft 62 within the hot stator 52. As will be seen below with respect to FIG. 10, an inner cavity 100 defined by the hot stator 52 is larger than the exterior shape of the hot rotor 50 to permit the rotor to rotate therein an offset manner. Likewise, the cold rotor 54 rotates in offset manner within an enlarged cavity defined by the cold stator 56. The cold rotor 54 rotates with the cold rotor shaft 86 which is offset from the central shaft 64 by the offset connector 88. The output shaft 46 aligns with the central shaft 64 by virtue of the right side offset connector 90.

Figure 10:
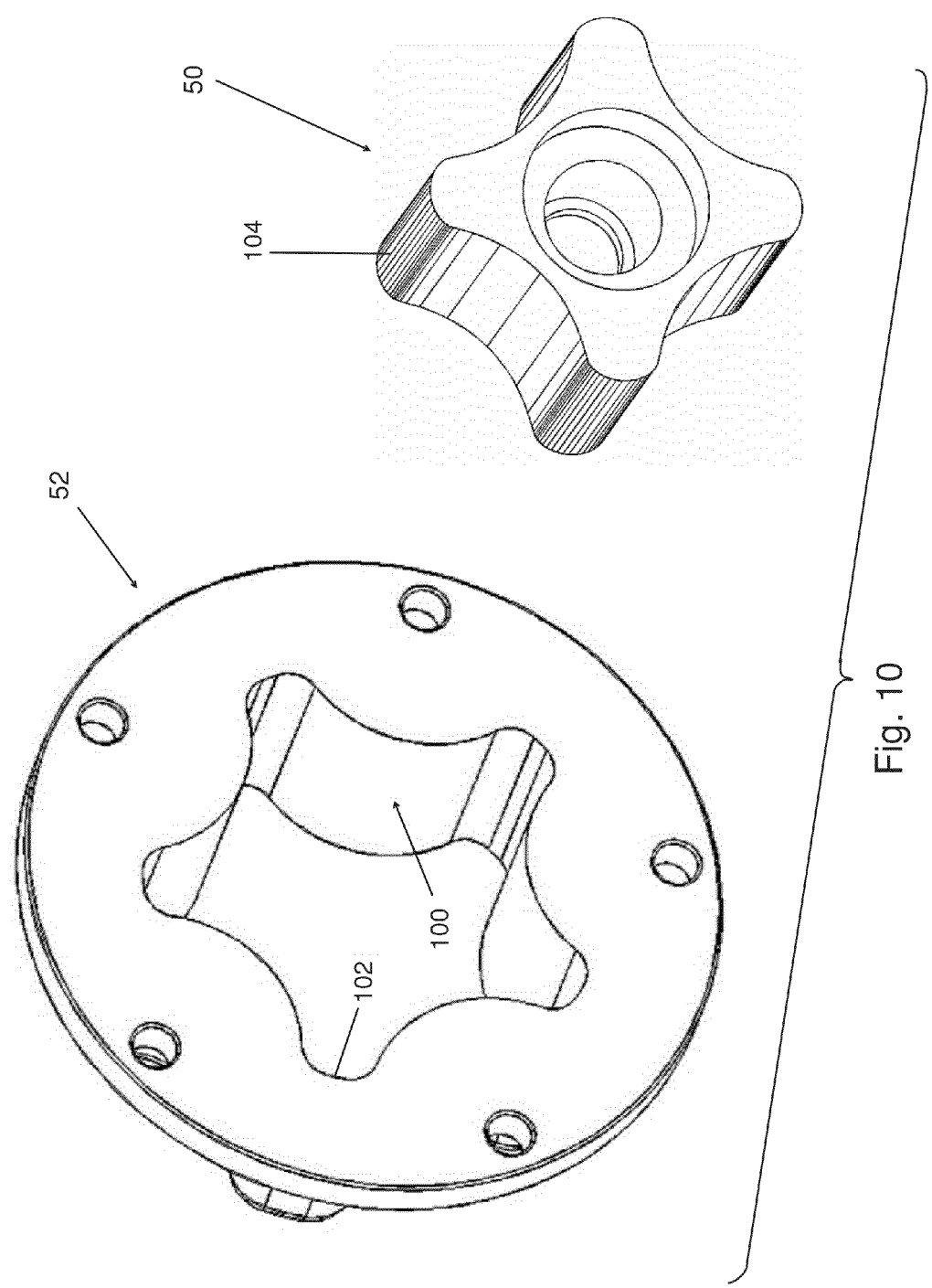
FIG. 10 is a perspective view of hot stator and rotor elements from the gerotor Stirling cycle engine of the present application.

FIG. 10 is a perspective view of hot stator 52 and rotor 50 that illustrate the aforementioned inner cavity 100, which is formed in a star shape with five evenly spaced and identical recesses 102. The hot rotor 50 also has a star shape, with four outwardly projecting lobes 104, each shaped and sized to fit within the stator recesses 102. As the hot rotor 50 rotates in an offset manner within the cavity 100, the outwardly projecting lobes 104 sequentially mate with the stator recesses 102. At any one time, a single outwardly projecting lobe 104 may fit entirely within one of the stator recesses 102, while spaces are formed between the rest of the rotor 50 and the cavity 100.

Figure 11:
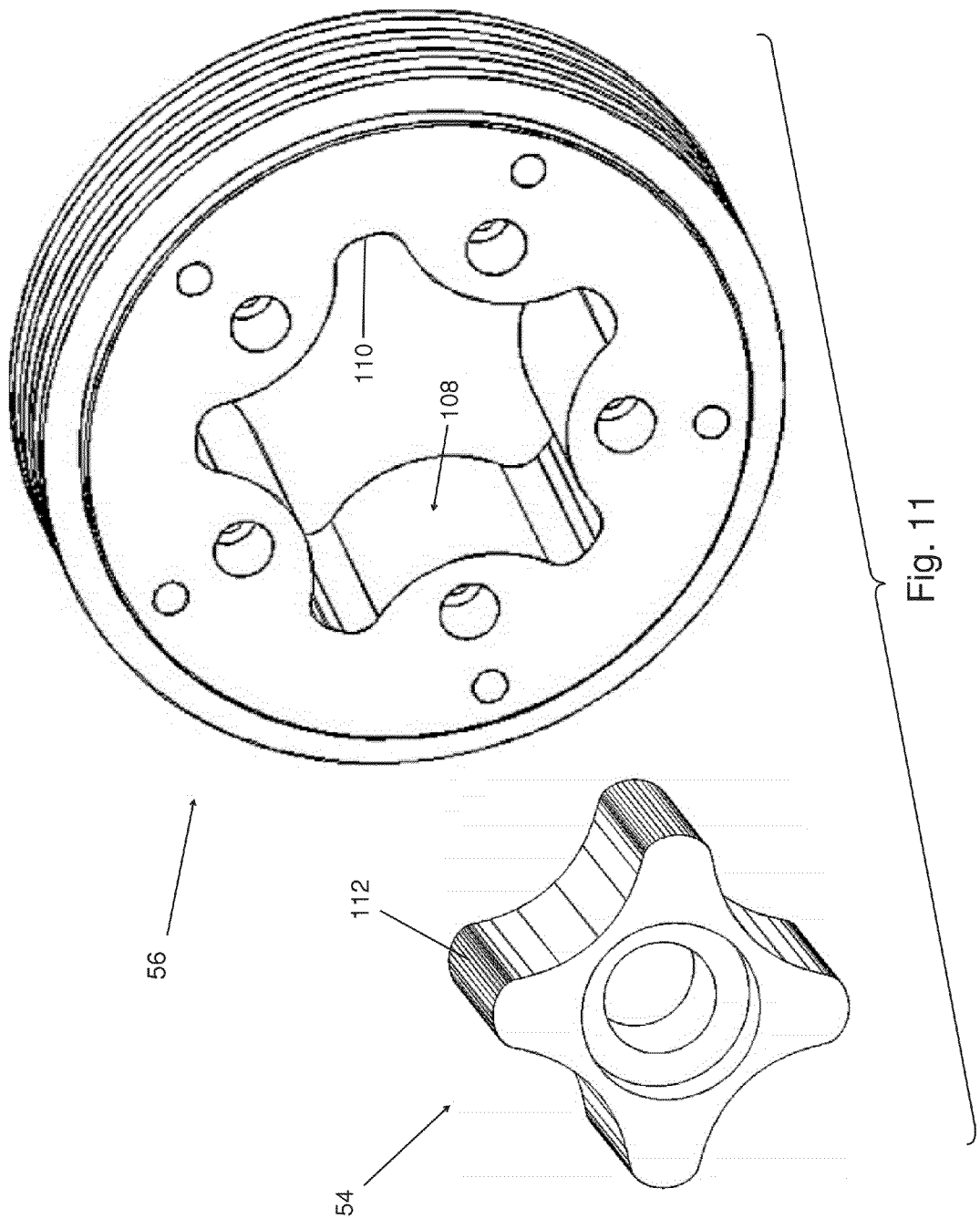
FIG. 11 is a perspective view of cold stator and rotor elements from the gerotor Stirling cycle engine of the present application.

FIG. 11 shows the cold rotor 54 and stator 56, illustrating a star-shaped cavity 108 in the stator with five outward recesses 110 in the stator within which the rotor rotates. The cold rotor 54 also has four outwardly projecting lobes 112, each of which fits closely within each of the five recesses 110 in the stator 56.

FIG. 12 shows the central regenerator 48 which features a plurality of axial bores, some for mounting the regenerator to the rest of the assembly, and one for each lobe of each hot and cold chamber rotor/stator pairs (in this case 5). That is, there are a plurality, preferably five, of internally-threaded bolt holes 120 that receive bolts 82 (see FIGS. 8A and 9) that secure the regenerator 48 to the cold rotor/stator. The aforementioned countersunk through holes 68 enable mounting of the heater backplate 66 to the regenerator 48 with bolts 122 (see FIG. 8A). Five (5) relatively larger gas flow passages 130 pass entirely through the thickness of the regenerator 48, which is made of insulating material, and connect the working chambers of the hot side H of the engine to the working chambers of the cold side C without creating a significant solid conduction path. This way the gases can freely pass back and forth between the two sides in a closed passage without allowing the heat to travel through the body of the engine. Any significant heat transfer that occurs from hot side to cold side is facilitated only by the gas travelling through the insulated passages 130.

These insulated passages 130 are also filled with regenerative material (not shown, i.e. conductive material that has good heat capacity) for heat storage. For instance, the passages 130 may be filled with a metallic wool such as copper or steel as the regenerative material. Since the thermodynamic process is heat transfer dependent and thus time dependent, the faster that the gases can be heated and cooled, the better the resulting output. Also, this means the process is dependent on efficiency, so energy lost to the environment is not desirable for maximum output. The regenerative material provides both an increase in heating and cooling speed as well as a way to store and reuse energy, which increases efficiency. This regenerative material also reduces the amount of dead volume because it has volume itself, additionally increasing output. The regenerative material should also have the characteristic of low drag in the path of the flowing gases to enhance its function, constantly storing and releasing heat to the passing gases without slowing them down or causing significant pressure drop to the flow.

As the cold gases move out of the engine's cold side C through the regenerator passage 130 to the hot side H, the cold gases cool the regenerative material, which in turn adds heat to the gases. This preheats the gases for the hot side, so less heating and less time is required to get the gas volume to max temperature (i.e. max pressure and volume). When the gas moves back through the passage 130 from the hot side H to the cold side C, the hot air is precooled by the regenerative material that was previously left cold by the gases when they moved thru cold. This chilling of the hot gas flow by the regenerative material leaves heat within the regenerative material. The regenerative material doesn't lose this stored heat to the environment due to its insulated surroundings. The heat is stored until the gases are fully chilled by the cold side of the engine and then make their way back across the passage. As they pass thru, the now cold gases are preheated by the hot regenerative material previously left hot by the gas flow, which in turn cools down the regenerative material and the cycle continues. This makes the time in the regenerative passages as well as some of the heat in the cycle not go to waste in the Thermodynamic process.

Figure 13:
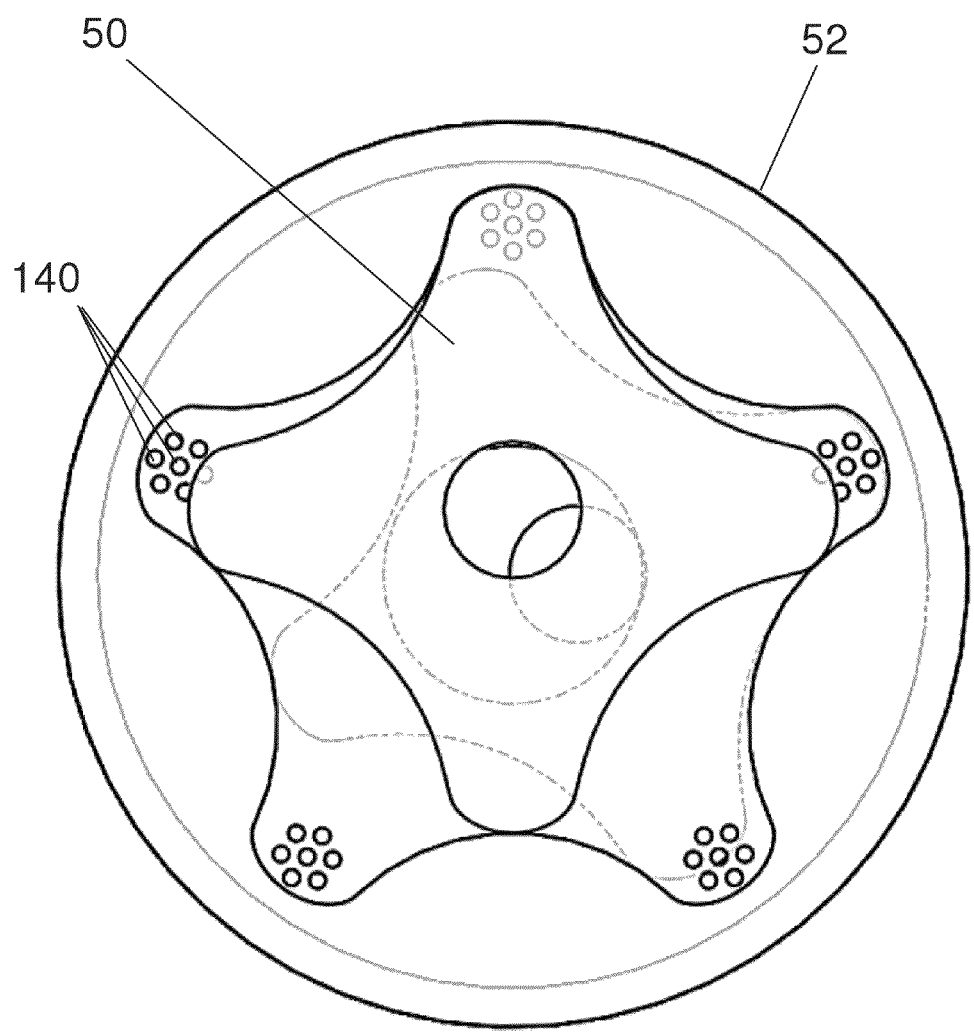
FIG. 13 is a schematic view of the hot stator and rotor elements of the gerotor Stirling cycle engine illustrating the relative locations of gas ports therein.
Figures 14A, 14B, 14C, 14D:
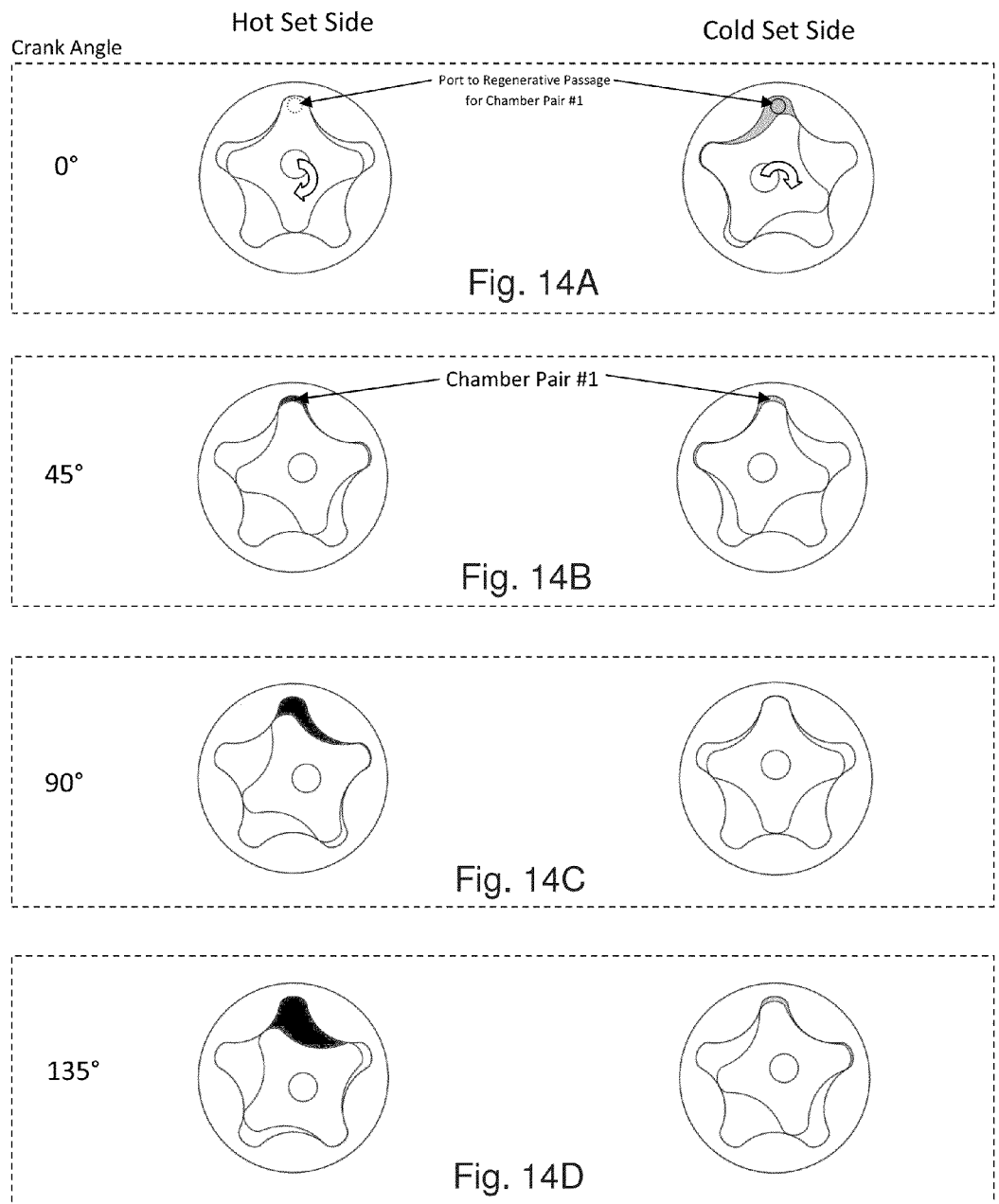
FIGS. 14A-14H show a sequence of positions of the gerotors within the cold side and hot side of the gerotor Stirling cycle engine at 15° angular rotations of a common shaft.
Figures 14E, 14F, 14G, 14H:
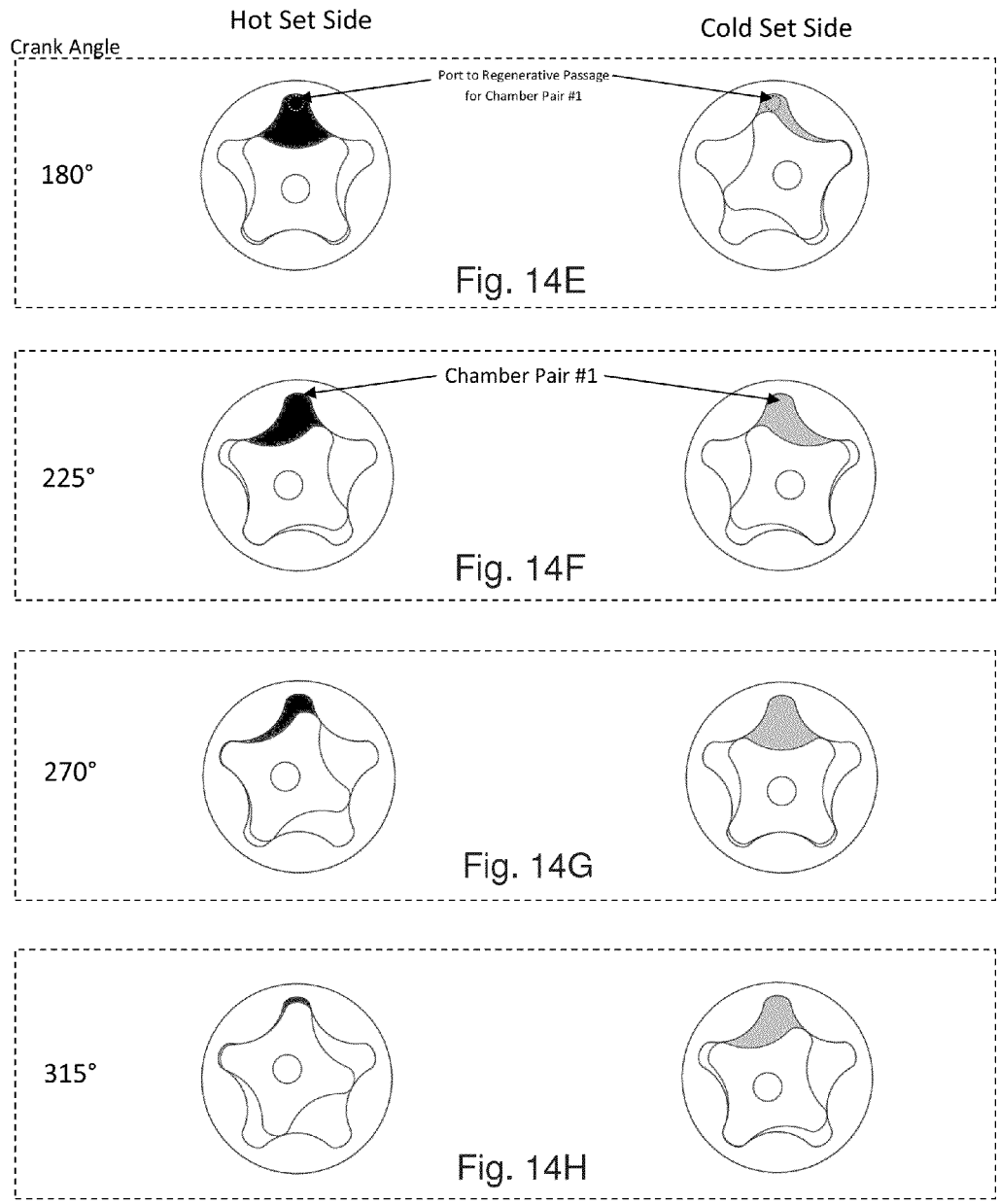

FIG. 13 is a schematic view of the hot stator 52 and rotor 50 elements of the gerotor Stirling cycle engine illustrating the relative locations of "salt shaker-style" gas ports 140 provided in both the heater backplate 66 and cooler backplate 80, and which are aligned with the previously-described insulated passages 130. The ports 140 are also seen in FIG. 9. The design of these ports 140 should take advantage of the material of the heater and cooler backplates 66, 80, which are conductive and thus there is an opportunity for improved heat transfer. As the gases pass through the ports 140 into the working chambers around each rotor 50, 54, they experience their first convective exposure to the hot or cold side of the engine. If the gases can be heated or cooled during their time in these ports, then the engine can operate faster. These ports 140 should be designed to expose maximum surface area of conductive backplate material to the gases to maximize heat transfer to the gases while also limiting pressure drop of the gas flow and dead volume within the ports (such as the optimal design of the gas side of a heat exchanger). This particular configuration shown with multiple smaller ports as apposed to a single large one is an attempt to gain more exposed surface area while keeping the similar pressure drop and less volume than a single port.

Figure 15:
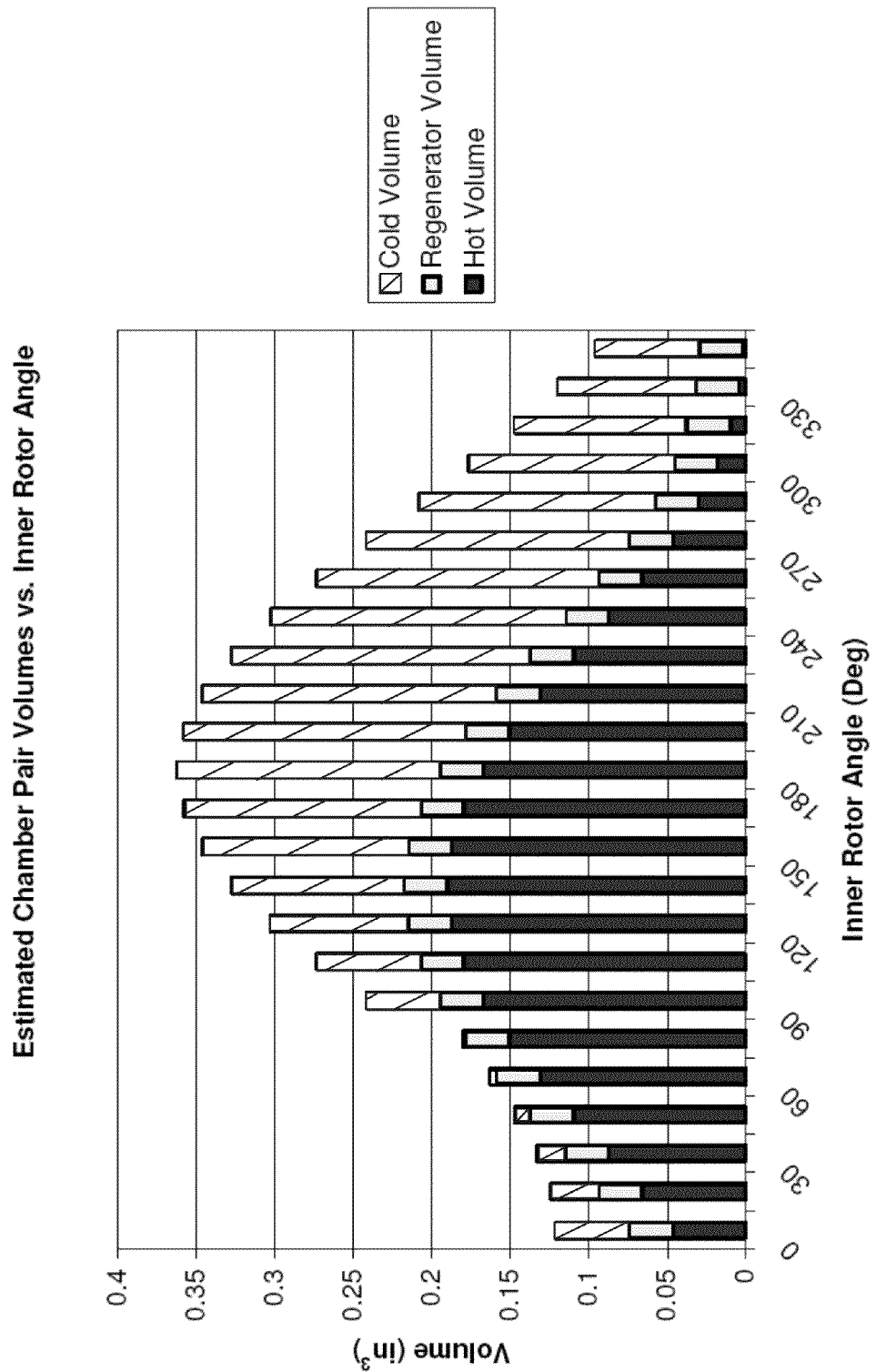
FIG. 15 is a graph of estimated hot and cold chamber volumes versus inner rotor angle for one full cycle of rotation.

FIGS. 14A-14H show a sequence of positions of the gerotors within the cold side and hot side of the gerotor Stirling cycle engine at 15° angular rotations of a common shaft. The pair of chambers shown are a hot and cold chamber pair that is connected via the gas ports and respective regenerator passage. FIG. 15 is a graph of estimated hot and cold chamber volumes versus inner rotor angle for one full cycle of rotation.

As shown in the sequence of FIGS. 14A-14H, the gas moves back and forth from cold side to hot side in a given chamber pair at the same time that the total volume of the chamber pair increases and decreases (graphed in FIG. 15). As the majority of the gas moves toward the hot side shown around 60° of rotation, the gas heats up and wants to expand in the closed chambers, causing a build up of pressure, and wanting to expand the chambers, which are very close to minimum volume at 60°. The heated pressurized volume expands, pushing out on the walls and energy is released. At 180° rotation, the point of maximum volume, half of the gas has moved into the cold side, starting the cooling process. As the gas cools, it wants to contract in the chambers and causes a vacuum, collapsing the chambers. As the chambers collapse, the majority of the gas starts to move into the cold side continuing cooling until it is all in the cold side and the chambers are fully collapsed at 360° rotation. The gas is then quickly moved back into the hot side (within 60° of rotation) to be heated again and the cycle repeated. This combination of the gases heating and cooling, wanting to expand and contract, while the total chamber volume also expands and contracts, induces the forces on the rotor faces in the gas chambers, which creates a net torque on the crankshaft, thus spinning the output shaft.

Ideally, exposing the hot side H of the engine 30 at equilibrium temperature to a heat source, such as the sun, will cause expansion of the hot side gasses and convective flow to start the rotors turning. However, engine 30 may also be connected to an alternator or starter motor, or even a hand crank, to start the rotation. After a short while the engine takes over and runs autonomously, much like the prior Sterling cycle engines as in FIG. 2.

Figure 16A:
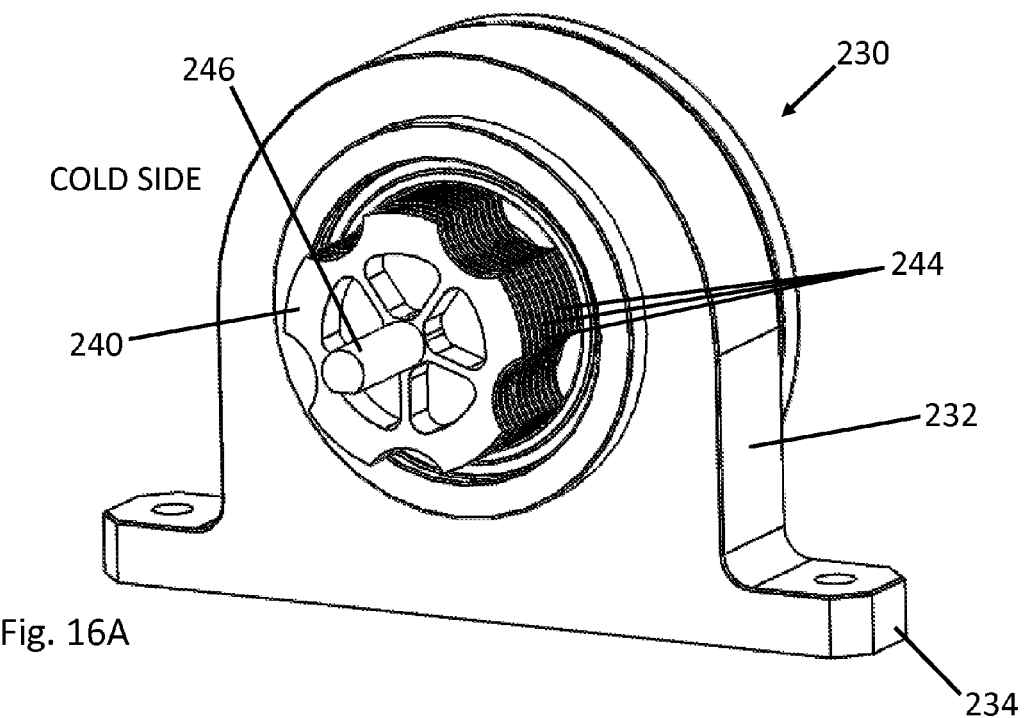
FIGS. 16A and 16B are perspective views of an alternative gerotor Stirling cycle engine from, respectively, a cold side and a hot side.
Figure 16B:
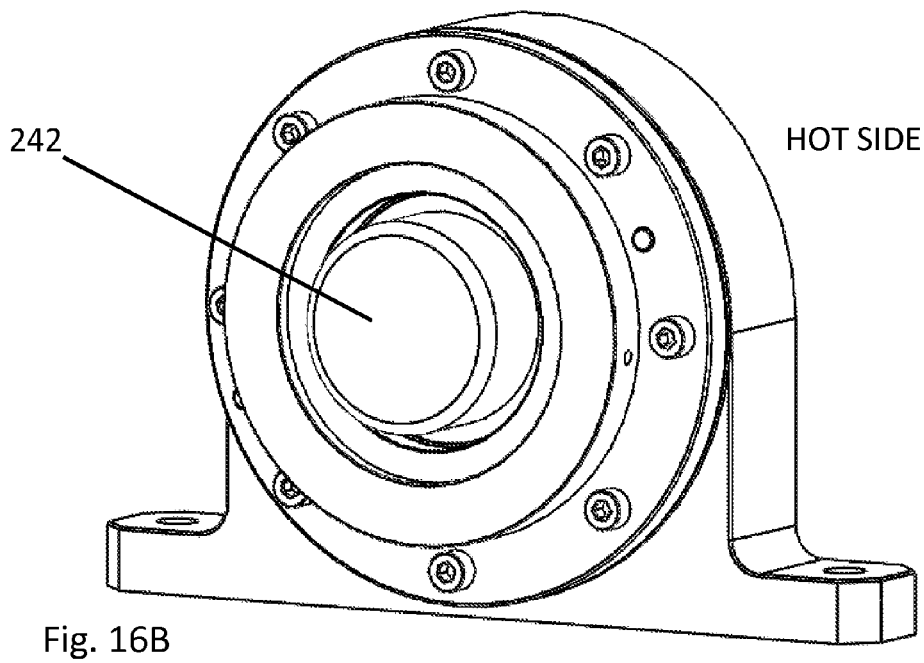
Figure 17:
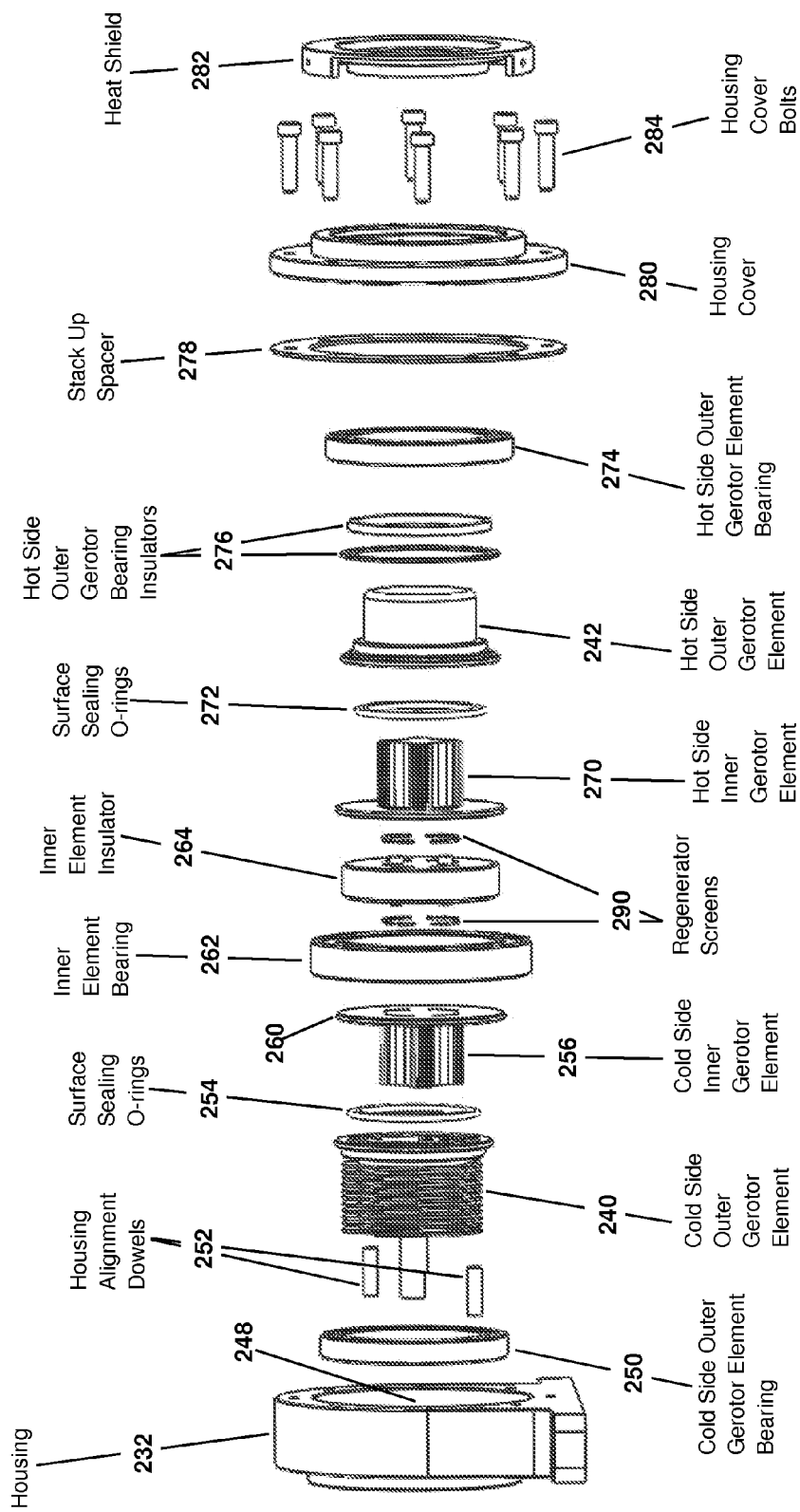
FIG. 17 is an exploded perspective view of the alternative gerotor Stirling cycle engine of FIGS. 16A and 16B.

FIGS. 16A and 16B are perspective views of an alternative gerotor Stirling cycle engine 230 from, respectively, a "cold" side and a "hot" side, while FIG. 17 is an exploded perspective view of the gerotor Stirling cycle engine. The illustrated engine 230 comprises an outer housing 232 generally shaped as a cylinder oriented with a horizontal axis and having a base with a pair of outward flanges 234 on its lower end for mounting to a support structure or foundation (not shown). The terms "cold" and "hot" sides refer to the relative temperature of the gases within the engine 230, and do not necessarily reflect absolute temperatures.

As seen in FIGS. 16A and 16B, the outer housing 232 defines a cylindrical through space from which a finned cold side stator 240 projects on the cold side, while a smooth cylindrical hot side stator 242 projects on the hot side. The cold side stator 240 features a plurality of arrayed fins 244 for heat dissipation. When operational, the hot side seen in FIG. 16B is exposed to an elevated temperature (heat source), such as by directing solar rays to the hot side stator 242 or exposing the hot side to exhaust gases from an internal combustion engine. By virtue of the components within the engine 230, as will be explained, differential temperatures cause airflow which, in turn, rotates a gerotor assembly which motion can be directed to a pump, generator or other secondary device to do useful work. Both the cold side stator 240 and the hot side hot side stator 242 rotate, and the cold side includes an output drive shaft 246 that can be coupled to the aforementioned secondary device.

It should be understood that the particular configuration illustrated is exemplary only, and the overall configuration of the engine 230 can be modified to fit particular environments. Furthermore, the size of the engine 230 can theoretically be scaled upward or downward as needed, though if the moving components become too large overcoming inertia may be a concern, while if the moving components are too small friction may become a detrimental factor.

With reference now to FIG. 17, an exemplary series of internal components of the gerotor Stirling cycle engine 230 is shown. Without going into detail concerning the function of these elements, a brief discussion of them as they are positioned axially sequence from the cold side to the hot side will be provided. As mentioned, the housing 232 provides a cylindrical space 248 within which a cold side outer gerotor element bearing 250 fits. A pair of alignment dowels 252 extends substantially the axial length of the housing 232 and maintains rotational alignment of inner gerotor elements, as will be described. A pair of concentrically-arranged surface sealing O-rings 254 provide a sliding seal against the gas passage between the cold side stator 240 and a cold side rotor 256. More specifically, the cold side stator 240 includes an inner flange having circular grooves (not numbered) within which the O-rings 254 are retained. The cold side rotor 256 includes a relatively wide inner flange 260 against which face the O-rings 254 seal. The radially outer edge of the flange 260 is journaled for a rotation within the housing 232 using an inner element bearing 262. The cold side stator 240 is positioned outside of the cold side rotor 256 relative to a midline of the engine, and thus the two components are also termed the outer and inner cold side elements, respectively.

Figure 19:
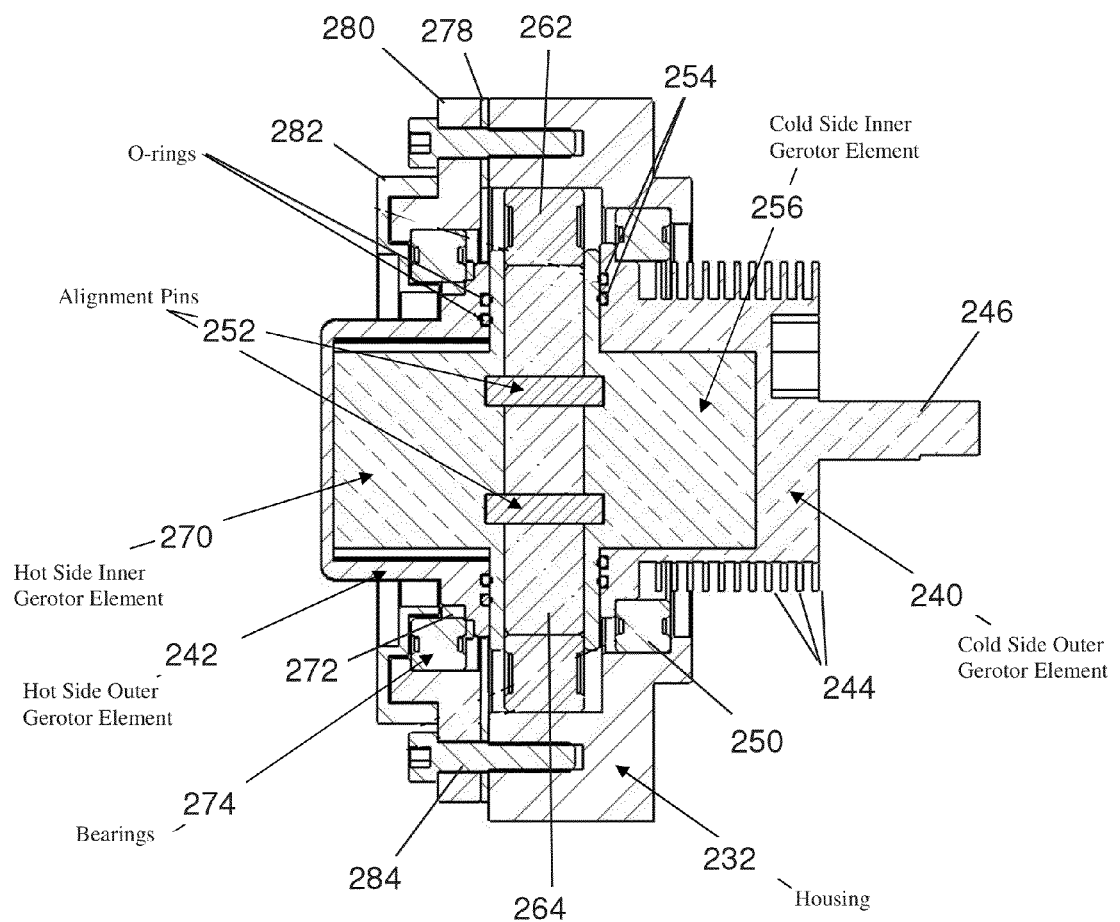
FIG. 19 is a vertical sectional view along a center line of the gerotor Stirling cycle engine taken along line 19-19 of FIG. 18.
Figure 20:
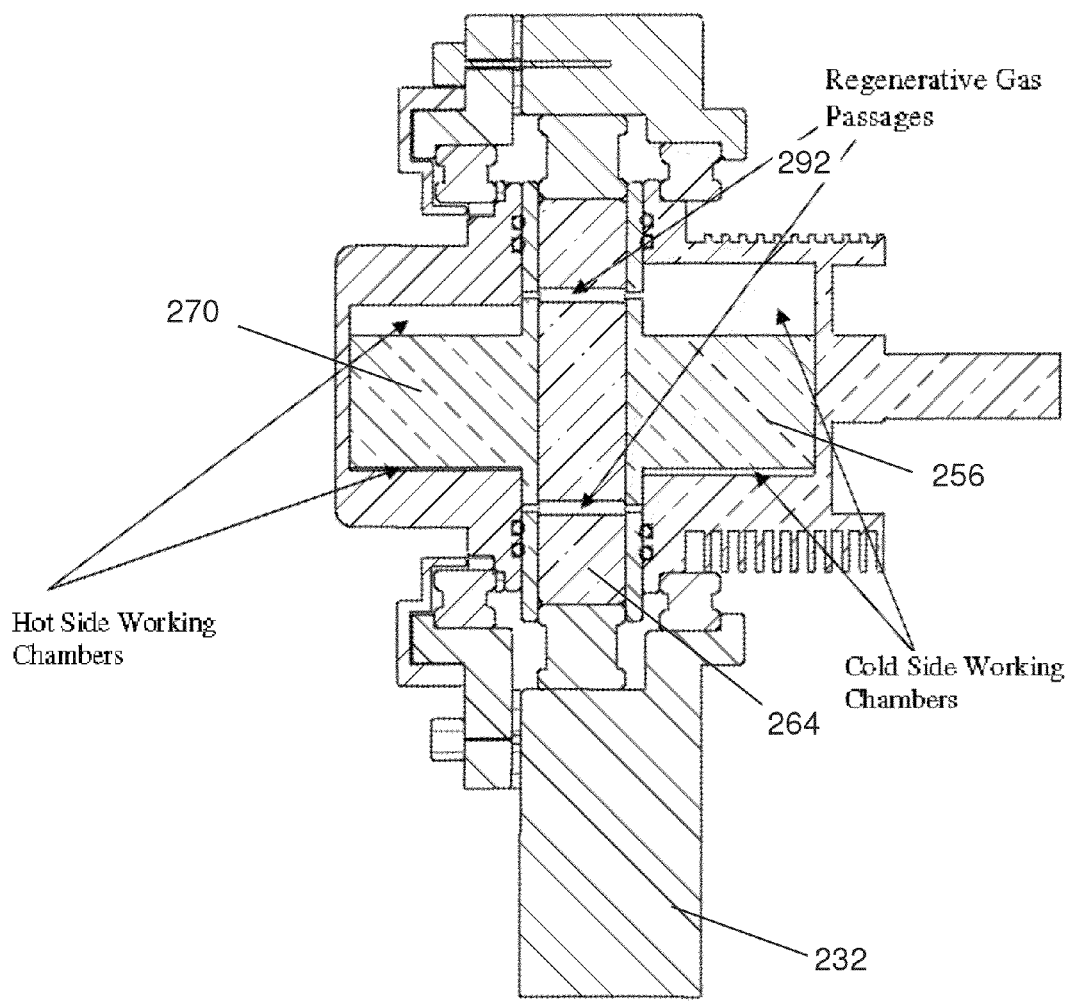
FIG. 20 is an oblique sectional view of the gerotor Stirling cycle engine taken along line 20-20 of FIG. 18.

As evident in FIG. 17, and also in the sectional views of FIGS. 19 and 20, the inner element bearing 262 is relatively larger than the cold side rotor bearing 250. Also journaled for rotation within the inner element bearing 262 is an inner element insulator 264 in the shape of a ring interposed between the hot side and cold side.

The hot side stator 242 (outer gerotor element) encloses a hot side rotor 270 (inner gerotor element) along with some surface sealing rings 272 within retaining grooves of the stator. The hot side stator 242 rotates within a bearing 274 which is assembled with some insulating rings 276 to prevent overheating of the bearing. An assembly spacer 278, housing cover 280 and heat shield 282 are then installed onto the housing 232 using bolts 284 to complete the assembly.

Two sets of regenerator screens 290 assembled between both sides of the insulator 264 and the hot and cold rotors 256, 270 contain thermally regenerative material, such as steel or copper wool or the equivalent, within regenerative gas passages 292 formed in the insulator. The inner element bearing 262, within which both the rotors 256, 270 and the insulator 264 rotate, installs into a cylindrical space within the housing 232 offset from the spaces in which both the cold side stator bearing 250 and the hot side stator bearing 274 are positioned. This facilitates the required offset between inner and outer gerotor elements for proper function.

Figure 18:
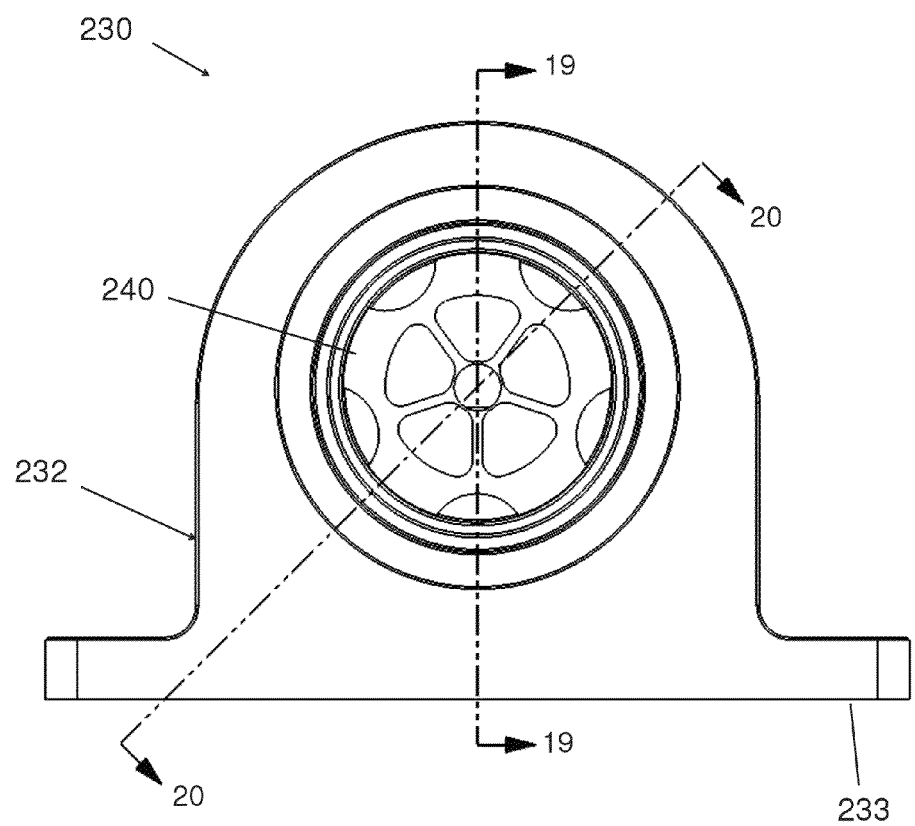
FIG. 18 is an elevational view of the cold side of the gerotor Stirling cycle engine as in FIG. 16A.

FIG. 18 is an elevational view of the cold side of the gerotor Stirling cycle engine 230 showing the outer housing 232 with a lower mounting flange 233. FIG. 19 is a vertical sectional view along a center line of the gerotor Stirling cycle engine in FIG. 18 taken along line 19-19, while FIG. 20 is an oblique sectional view taken along line 20-20.

With reference now to FIGS. 21-25, further details of the hot and cold stators 240, 242 and hot and cold rotors 256, 270 and the central insulator 264 will be described. The cold side stator 240 defines an internal star-shaped chamber 300 with rounded surfaces. The cold side rotor 256 features a lobed rotor element 302 having a plurality of outwardly projecting rounded lobes which fit closely within the outer cavities of the star shaped chamber 300 in the stator 240. As before, there are more outer cavities in the chamber 300 than there are lobes on the rotor element 302, as in the illustrated embodiment which has four lobes/five cavities. In a similar manner the hot side stator 242 defines an internal star-shaped chamber 304 with rounded surfaces, and the hot side rotor 270 has a lobed rotor element 306. The four lobes of the rotor element 306 fit closely within the five outer cavities in the chamber 304. Both the rotors 256, 270 rotate within the respective star-shaped chambers 300, 304, and sequentially close and open spaces therebetween.

Both the cold rotor 256 and the hot rotor 270 include gas passages 308, 310, respectively, which match the gas passages 292 in the insulator to 64. As shown, there are four gas passages 292 in the insulator 264, each of which having an arcuate configuration generally arranged around the central axis and extend axially through the insulator. Likewise, cold rotor 256 has four arcuate gas passages 308, and hot rotor 270 has four arcuate gas passages 310, each of which spans the area between lobes of the respective rotor. As explained above, the cold rotor 256 and hot rotor 270 sandwich the insulator 264 therebetween and rotate therewith, all of the four separate gas passages 292, 308, 310 being in alignment at all times.

The thermodynamic operating principles of the alternative gerotor Stirling cycle engine 230 are similar to the first gerotor Stirling cycle engine 30 as far as gas flow. The hot and cold connected chamber pairs displace the gas in the same manner and exchange it through the curved slits and screens instead of the salt shaker ports 140 of the earlier design. One big difference in the alternative engine 230 is that all gerotor elements, outer and inner, rotate around their centers of mass within bearings mounted inside a stationary housing, whereas in the gerotor Stirling cycle engine 30 the outer elements are the stationary outer housing and the inner elements wobble inside them connected by a crankshaft. Otherwise, the chambers displace and transfer gases back and forth from hot to cold side in the exact same way.

Proposed is a new mechanical configuration of a rotary Stirling cycle engine (hot air engine). Utilizing two gerotor sets, a "hot set" and "cold set" (set=inner and outer elements), as insulated as possible from each other from solid material heat conduction. In the preferred embodiment, the inner element of one set is offset axially with respect to the inner element of the other set, while the outer elements are aligned axially, rotationally lobe to lobe and structurally connected. The disclosed rotary Stirling cycle engine/heat pump, would replace less efficient Stirling units used for similar applications to improve performance. The higher efficiencies would allow the rotary units to be utilized for additional power/heating/cooling/processing applications. One possible application is to place the disclosed rotary Stirling cycle engine in the exhaust stream of an Otto cycle or Diesel engine of a hybrid vehicle to pull waste power for storage or for onboard use as in an air compressor for the engine's intake to boost power (Stirling Turbo).

These outer gerotor elements are assembled together into a single subassembly, with low conductivity material between hot and cold elements for insulation purposes. This insulated layer has fixed regenerative gas passages buried inside the low conductivity material which allows gasses to flow across the conduction insulation. The displacing chambers of the hot and cold gerotor sets are connected via these regenerating gas passages. The passages are designed to have low pressure drop with maximum surface area of regenerative material (i.e. copper screens, etc.) to facilitate regeneration of the back and forth gas flow with minimal losses. The heater/cooler passages should be designed in the same way, but to promote heat flow between the gas and the metal of the blackplates. The vast majority of the heat transfer from hot to cold sides should occur via this gas flow, not conduction through the solid materials.

The displacing chambers on each side must be well sealed from each other to prevent cross-leakage. Some mirror cross-leakage between adjacent chambers is expected and may be tolerable. The entire working volume should also be well sealed from the outside environment to prevent working gases from escaping the engine as it heats and the gas pressure rises, except where an atmospheric buffer pressure is desirable for the application.

The inner gerotor elements, offset axially, create connected reciprocating displacing chambers ~90° out of phase with each other as in a typical alpha-type Stirling engine. The timing of chamber volumes is such that the majority of the air is heating when the total gas volume is increasing, doing work on the chamber walls and the majority of the gas is cooling when the total gas volume is decreasing, doing more work on the chamber walls. This process will also result in a general heat flow across the engine from heat source to hot side gerotor set through the regenerative passages into the cold side gerotor set, and then into the gases in the outer environment which are cooling the cold side outer gerotor element fins. Although 90° is an exemplary axial offset to accomplish this process in a rotary configuration, other angular offsets are contemplated to change with motor speed due to heat transfer speed limitations within the engine. Changing this offset actively could also provide means of throttling the engine, as would devices that dynamically add dead volume to the system. An engine with an offset that is mechanically variable and programmable against speed would be preferred.

The hot side must be exposed to a heat source that provides enough energy to cause the gas to turn the engine. The hot side gerotor set is the hottest part of the engine, as the name would indicate, and must be well insulated from heat sensitive mechanicals such as bearings and seals not rated to high enough temperatures. Heat shielding and low conductivity materials should be used to protect these heat sensitive areas to prevent engine damage and failure.

The heat source should be applied directly to the hot side outer gerotor. Preferably the hot side outer gerotor would be surrounded by an insulated heat trapping chamber that the heat enters but cannot escape, specifically when the heat source is radiation (e.g., solar energy). When the heat source is radiation, it is desirably that the hot side outer gerotor has a transparent area or window (i.e. on its face) to allow the radiation to pass through to the hot side inner element which could be coated with radiation absorbent material, thus delivering the heat directly to the inside of the hot side of the engine. Not only would this increase the heat transfer efficiency in the hot side, but it might reduce the heat resistance requirement of the outer element on the hot side. Gerotor materials should be highly conductive to ensure rapid heat transfer from the outer element to the inner element and to the air in the displacing chambers. To improve metal to air heat transfer, features may be provided that increase surface area in portions of the engine where this heat transfer is beneficial (e.g., surface roughening, fins) All gerotor elements are mounted on bearings that allow them to rotate about their center axes and centers of mass to eliminate vibration and energy loss. In a wobble configuration, where the inner elements orbit inside the outer elements about an offset shaft, the system must be balanced with counterweighting to prevent vibration. Bearing and sealing configurations shall be optimized to minimize the resultant drag on rotating components. Lubrication within the working chambers shall be utilized to reduce frictional drag as well as improve chamber-to-chamber sealing. This lubricated or "wetted" gerotor configuration can be accomplished on the hot side via high temperature lubricants or greases such a Tungsten Disulfide Grease. The gas within the working chambers should be selected to optimize heat transfer from the chamber walls to the working gas. The weights, sizes, materials, and aspects ratios of components can be optimized for various temperature differentials, heat sources, heat concentrations, or environments. This design also works as a heat pump if mechanically driven.

Rotary Stirling engines utilizing the principles described herein can be accomplished in many ways using various physical configurations. Most rotary positive displacing machinery like gerotor sets, Wankel rotors and housings, scroll pump rotors, or rotary vane pumps and housings can be used in pairs with connected displacing chambers at ~90° out of phase between hot and cold sides to create rotary alpha-type Stirling engines. In general, the engines described herein have two rotary displacement mechanisms, one hot and one cold, with displacing chamber pairs (hot connected to cold), connected such that they are 90 degrees out of phase like a typical alpha type Stirling configuration. Various chamber volumes, gerotor/rotor shapes, number of gerotor lobes/vanes, component materials, and other geometry can be modified to more efficiently harness energy at various temperatures, energy rates, overall temperature differentials, and in different physical environments. For example, low temperature differentials would mean small changes in gas volume/pressure from hot to cold sides, so a lighter, lower drag, lower compression ratio engine would make sense in this situation. It should also be noted that changing the phase relationship between hot and cold connected displacing chambers will most likely alter performance as well as change the overall compression ratio of the engine. The examples set forth herein put the connected chambers at an initial 90° out of phase, as in a typical reciprocating piston style alpha-type Stirling engine, which results in a ~5:1 compression ratio. However, this should not be construed to limit the angular offset and/or compression ratio for all intended uses. This "90° out of phase" means the cold chamber is 90° behind in its cycle than the hot chamber to which it is connected by the regenerative passages. The exemplary design will allow for easy modification to this phase offset, such as by up to 10°, thus facilitating determination of the effect of its change on performance and function.

Embodiments of the invention may provide a number of technical advantages, such as:
  Efficiency benefits, Low momentum losses, especially for those versions with few moving parts and no reciprocating components, such as valves and pistons, or off-center rotors (preferably rotors rotate about their center of mass) Low Heat loss
  Compact/portable power, the high efficiencies would allow for smaller units.
  Inexpensive, the simple design requires few components and doesn't require exotic materials.
  Reversible, can also be used for heat pump applications.
  Easily manufactured, low maintenance, simple design can be easily serviced.
  Expected to be self-starting, will start turning just from the application of heat.

While the invention has been described in its preferred embodiments, it is to be understood that the words which have been used are words of description and not of limitation. Therefore, changes may be made within the appended claims without departing from the true scope of the invention.

What is claimed is:

1. A closed Stirling cycle power system, comprising:
a housing having a drive shaft defining a central axis;
a hot side including a hot rotor and a hot stator and hot side displacing chambers created in an offset space therebetween, the hot stator and hot side displacing chambers being fixed with respect to the housing and centered around the central axis, while the hot rotor rotates within the hot stator about a hot rotor axis offset with respect to the central axis and is connected to rotate the drive shaft, and wherein the hot rotor axis orbits around the central axis;
a cold side including a cold rotor and a cold stator and cold side displacing chambers created in an offset space therebetween, the cold stator and cold side displacing chambers being fixed with respect to the housing and centered around the central axis, while the cold rotor rotates within the cold stator about a cold rotor axis offset with respect to the central axis and is connected to rotate the drive shaft, and wherein the cold rotor axis orbits around the central axis, wherein the rotational angle of the cold rotor is out of phase with the rotational angle of the hot rotor; and
a stationary barrier member of thermally insulating material between the hot and cold sides, the barrier member having regenerative gas passages to allow gasses to flow therethrough thus connecting the displacing chambers of the hot and cold sides, wherein
when rotary power is applied to the drive shaft the device will act as a heat pump and the hot side will get hotter and the cold side will get colder.

2. The power system of claim 1, further including:
a battery; and
an electric generator having the drive shaft as an input and coupled to recharge the battery.

3. The power system of claim 2, further including;
a drive transmission;
an internal combustion engine coupled to the drive transmission; and
an electric drive system coupled to the drive transmission and powered by the battery.

4. The power system of claim 1, wherein the rotational angle of the cold rotor is 90° out of phase with the rotational angle of the hot rotor.

5. The power system of claim 1, wherein the cold stator includes a plurality of heat-dissipating fins on its exterior.

6. The power system of claim 1, wherein the drive shaft extends outward through the cold stator and connects to the cold rotor through an offset bearing.

7. The power system of claim 1, further including regenerative material placed within the regenerative gas passages that permits gas flow therethough and has good thermal conductivity.

8. The power system of claim 7, wherein the regenerative material is a metallic wool.

9. The power system of claim 1, wherein the drive shaft is rotationally connected to the hot and cold rotors which both rotate about shafts which are connected to the drive shaft through offset connectors.

10. The power system of claim 9, wherein the offset bearings of the hot and cold rotors are both fixed to rotate with a central shaft that extends through a space within the barrier member, and further including a counterweight attached to rotate with the central shaft within the space in the barrier member.

11. The power system of claim 1, further including a heat conductive heater backplate mounted between the hot side and stationary barrier member and a heat conductive cooler backplate mounted between the cold side and stationary barrier member, wherein both the heater and cooler backplates have a plurality of small gas ports aligned with the regenerative gas passages within the stationary barrier member.

12. A closed Stirling cycle power system, comprising:
a housing having a drive shaft defining a central axis;
a hot gerotor set having a hot rotor with a first number of outwardly-extending lobes rotating within a stationary hot stator having a second number of recesses sized to closely receive the lobes, the first number being one less than the second number, and displacing chambers created in an offset space between the hot rotor and hot stator;
a cold gerotor set having a cold rotor with a third number of outwardly-extending lobes rotating within a stationary cold stator having a fourth number of recesses sized to closely receive the lobes, the third number being one less than the fourth number, and displacing chambers created in an offset space between the cold rotor and cold stator, wherein the respective recesses of the cold stator and the hot stator are aligned, and the cold rotor has an axis of rotation offset with respect to the hot rotor, and wherein the cold and hot rotors are connected to rotate the drive shaft; and
a stationary barrier member of thermally insulating material between the hot and cold gerotor sets, the barrier member having regenerative gas passages at the outward extents of the aligned hot and cold stator recesses to allow gasses to flow therethrough, wherein the displacing chambers of the hot and cold gerotor sets are connected via the regenerative gas passages, wherein
when rotary power is applied to the drive shaft the device will act as a heat pump and the hot side will get hotter and the cold side will get colder.

13. The power system of claim 12, further including;
a battery; and
an electric generator having the drive shaft as an input and coupled to recharge the battery.

14. The power system of claim 12, wherein the rotational angle of the cold rotor is 90° out of phase with the rotational angle of the hot rotor.

15. The power system of claim 12, wherein the cold stator includes a plurality of heat-dissipating fins on its exterior.

16. The power system of claim 12, wherein the drive shaft extends outward through the cold stator and connects to the cold rotor through an offset bearing.

17. The power system of claim 12, further including regenerative metallic wool placed within the regenerative gas passages that permits gas flow therethough and has good thermal conductivity.

18. The power system of claim 12, further including a heat conductive heater backplate mounted between the hot gerotor set and stationary barrier member and a heat conductive cooler backplate mounted between the cold gerotor set and stationary barrier member, wherein both the heater and cooler backplates have a plurality of small gas ports aligned with the regenerative gas passages within the stationary barrier member.

19. The power system of claim 12, wherein the drive shaft is rotationally connected to the hot and cold rotors which both rotate about shafts which are connected to the drive shaft through offset connectors.

20. The power system of claim 19, wherein the offset bearings of the hot and cold rotors are both fixed to rotate with a central shaft that extends through a space within the barrier member, and further including a counterweight attached to rotate with the central shaft within the space in the barrier member.

* * * * *